US009124465B1

(12) United States Patent
Findlay et al.

(10) Patent No.: US 9,124,465 B1
(45) Date of Patent: Sep. 1, 2015

(54) METHODS AND APPARATUS FOR PROCESSING INCOMPLETE OR INVALID DIALED NUMBERS

(75) Inventors: Leonard Patrick Findlay, Belleville (CA); Adarsh Kaithal, Bhopal (IN); Raghunath Satyanarayana, Sagar (IN); Ramakrishna Raju Nimishakavi, Andhra Pradesh (IN); Sachin H. Kamat, Bangalore (IN); Jinping Han, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 2996 days.

(21) Appl. No.: 10/955,524

(22) Filed: Sep. 30, 2004

(51) Int. Cl.
*H04L 12/50* (2006.01)
*H04L 29/06* (2006.01)

(52) U.S. Cl.
CPC ............................ *H04L 29/06027* (2013.01)

(58) Field of Classification Search
CPC ............... H04L 29/06; H04Q 2213/13209; H04Q 11/045; H04Q 2213/13322; H04Q 2213/13097; H04Q 2213/1307; H04Q 3/0025; H04Q 2213/13039; H04Q 2213/13156; H04Q 2213/13096; H04Q 2213/13176; H04Q 2213/13353; H04Q 2213/1338; H04M 2242/22
USPC ................. 370/352–356, 401, 466, 464, 467; 379/219, 229, 230, 237
See application file for complete search history.

(56) References Cited

U.S. PATENT DOCUMENTS

| | | | |
|---|---|---|---|
| 6,111,893 A * | 8/2000 | Volftsun et al. ............... | 370/466 |
| 6,151,628 A * | 11/2000 | Xu et al. ....................... | 709/225 |
| 6,424,835 B1 * | 7/2002 | Shin .............................. | 455/445 |
| 6,567,659 B1 * | 5/2003 | Sbisa .......................... | 455/414.1 |
| 6,674,745 B1 * | 1/2004 | Schuster et al. .............. | 370/352 |
| 6,788,775 B1 * | 9/2004 | Simpson .................. | 379/207.13 |
| 6,967,972 B1 * | 11/2005 | Volftsun et al. ............... | 370/466 |
| 2001/0036159 A1 * | 11/2001 | Katz et al. .................... | 370/241 |
| 2002/0159570 A1 * | 10/2002 | Langsenkamp et al. ........ | 379/68 |
| 2003/0007483 A1 * | 1/2003 | Um ............................... | 370/352 |
| 2004/0172265 A1 * | 9/2004 | Spragle et al. .................... | 705/1 |
| 2004/0258239 A1 * | 12/2004 | Gallant et al. ............... | 379/900 |

OTHER PUBLICATIONS

Camarillo et al., Mapping of ISUP Overlap Signalling to SIP, May 2001.*

* cited by examiner

*Primary Examiner* — Akelaw Teshale
(74) *Attorney, Agent, or Firm* — Barnes & Thornburg LLP

(57) ABSTRACT

Calls which fail in the ways described above will typically result in a server (GK, MGC, RS or Ps for example) in the network issuing a failure message. This message typically provides one of two options; call forwarding to a central answering position or call clearing. The message does not allow for any more intelligent decisions to be taken and information about the reason for failure is irretrievably lost. By enhancing the message with an indication of the reason for failure and an optional recommendation for handling, the processing of such failed calls may be improved. For example, a gateway which receives the failure message may simply act in the usual way and either forward or clear the call. However with the enhanced indication, it may instead choose to carry out alternative actions such as collect more digits and retry at end of dial. If overlap signalling is being provided and the IP cloud is not fully overlap compatible, the gateway might also do an overlap to en bloc conversion. Another option is to collect at least one more digit and retry the call. This typically works well if overlap signalling is not used.

18 Claims, 18 Drawing Sheets

METHODS AND APPARATUS FOR PROCESSING INCOMPLETE OR INVALID DIALED NUMBERS

FIELD OF THE INVENTION

This invention relates to the handling of telephony calls in an IP domain and in particular to the handling of calls attempted with incomplete or invalid numbers.

BACKGROUND OF THE INVENTION

Different internet protocol (IP) devices can provide address analysis and routing capabilities. These include H.323 gatekeepers (GK), SIP redirect servers (RS) and proxy servers (PS), MGCP (media gateway control protocol) media gateway controllers (MGC)

In all cases this type of device attempts to resolve information such as a dialled number, to a destination IP address or IP address and port. When sufficient information is available (for example, a fully dialled telephone number) the resolution is relatively easy to achieve and the device can map the information to a provisioned IP address. However, if the dialled number is not found, the handling of such call is much more difficult and presently is handled inefficiently.

H.323 and other protocols allow a local server to query its peers if an address is not found. For example, if an H.323 gateway uses an admission request message (ARQ) to find an IP address but its GK does not have that entry provisioned, if the GK has several peers, the local GK is able to query its peers to determine if one of those peers has that number. If it does, the peer may respond to the request with information about the number.

However, such a peer query may fail for several reasons depending on the protocol in use. If, for example, a peer H.323 GK was unable to respond in a timely manner, the originating GK may have to proceed with incomplete information. If the GK that did not respond was the one which 'owned' the dialled number, the call will fail.

In this situation, one option is to provide a default route for invalid numbers. This may be a route to a default answer gateway which may provide handling from a centralised answer position which will route the number after the caller tells an operator the correct number. However, this labour intensive.

Furthermore, it may be that the number is incomplete rather than invalid. Using the existing protocols, it is not possible to differentiate between an invalid number which must route to an answering position for manual intervention and an incomplete number which may need to be routed to the answering position.

This difficulty is especially visible in H.323. This protocol is "overlap signalling friendly"; meaning that the transmission of the called party digits in multiple messages (overlap signalling) is provided for as an option in the H.323 standard. For example, if an overlap gateway (GW) and an overlap GK have a peer GK which does not support overlap signalling, every call which needs the non-overlap GK to resolve it, could fail because the non-overlap GK may receive a number too short to resolve because it is unable to wait for the remainder of the number to arrive in one or more further message. Thus any calls attempted using overlap signalling and any numbers that are too short to resolve will fail. Each of those calls will require manual intervention to complete. Thus, for example, a call originating in a TDM or ISDN network which may use overlap signalling may not be handled efficiently when making the transition into the IP domain unless all the servers in that domain are overlap capable.

One possible solution is to take advantage of fixed length numbering plans. For example in North America, the plan is a three digit area code, a three digit exchange code and a four digit number. Thus numbers may be held in some way until it is known that the full number has been dialled. This means that calls should only fail through invalid numbers since all numbers must be complete. However, some other countries have variable length area codes (for example in the UK, city codes vary from two to four digits in length). As explained below, this makes such a scheme difficult to implement.

One alternative is to require calls to be held at the user terminal until fully dialled as is done with cell phones. However, legacy phones do not have this capability and digits are usually sent as they are dialled once the phone has gone off hook.

Another possible solution is to hold the call in the network by storing digits until the number is fully dialled, for example, using an intervening server, switch or possibly, a gateway. However, this has several practical shortcomings.

Unless the intervening server has a full dial plan for the destination being called, the server still requires some indication that the user has completed dialling the call. This could be achieved by dialling a special key, by using an end of dial timer or using some other mechanism.

The provision of a full dial plan is impractical. This requires a significant administrative overhead since the server needs to know every possible dial combination in the world and be kept up-to-date with any changes. Also, when the number is invalid, the user still has to dial the full number to achieve "end of dial" before a number is rejected.

The use of timers is also undesirable because the interval between the last digit being dialled and the audible ringback becomes very large. Normal telecom requirements suggest an interval of less than one second. Normal end of dial timers exceed four seconds. Thus if a call breaks out from an IP domain to an overlap capable ISDN domain and then over analogue signalling TDM trunks, such as dial pulse, the time to outpulse the digits on the dial pulse trunk is in the order of seconds. This happens after the last digit is dialled and the call traverses the IP domain so any delays are then added to the existing post dial timer delay. This provides unacceptable network performance.

Another solution is to replace network infrastructure and units with hardware that uses a "dial the number and press send to initiate" scheme. This is unacceptable to most users and is very costly.

A further solution is to accept that many calls will now require human intervention, when the address resolution server sends the call to a central answering position. This greatly slows many calls and also increases the workload at these stations.

SUMMARY OF THE INVENTION

Calls which fail in the ways described above will typically result in a server (GK, MGC, RS or PS for example) in the network issuing a failure message. This message typically provides one of two options; call forwarding to a central answering position or call clearing. The message does not allow for any more intelligent decisions to be taken and information about the reason for failure is irretrievably lost.

By enhancing the message with an indication of the reason for failure and an optional recommendation for handling, the processing of such failed calls may be improved. For example, a gateway which receives the failure message may simply act in the usual way and either forward or clear the call. However with the enhanced indication, it may instead choose to carry out alternative actions such as collect more digits and retry at end of dial. If overlap signalling is being provided and the IP cloud is not fully overlap compatible, the gateway might also do an overlap to en bloc conversion. Another option is to collect at least one more digit and retry the call. This typically works well if overlap signalling is not used.

The message may be enhanced, for example, by adding a Header Part or Body Part to a SIP message, for example. Alternatively, H.225 messages may be enhanced by the addition of ASCII strings in the non-standard data field. This is explained in more detail below.

According to a first aspect of the invention there is provided a method of processing calls in an IP telecommunications network comprising the steps of receiving a call setup request, recognising that the called number cannot be resolved to an IP address, generating a failure message indicating the call cannot complete and including an enhancement indicator, and determining which action to take in response to the failure message chosen from the group of acting in response to the message and acting in response to the enhancement indicator.

According to a second aspect of the invention there is provided a media gateway for an IP telecommunications network, arranged to receive an enhanced failure message which includes an enhancement indicator and further arranged to determine which action to take in response to the failure message chosen from the group of acting in response to the failure message and acting in response to the enhancement indicator.

Typically an enhanced gateway of this type will act on an included recommendation. If a recommendation is absent then the gateway may choose a default action for that type of failure (which may be one of the actions discussed above). The default action for the gateway may also be simply to follow the instructions in the failure message (to forward or clear). If no indication or recommendation is present (i.e. a legacy type message) then the gateway treats the failure message in the usual way.

In a further aspect, the invention provides a media gatekeeper-type device for an IP telecommunications network, arranged to generate an enhanced failure message when a called number cannot be resolved to an IP address, the failure message including an enhancement indicator.

In another aspect, the invention provides a failure message for issuance by a gatekeeper-type device in an IP telecommunications network when a called number cannot be resolved to an IP address, the message including an indicator of the reason for failure.

In a yet further aspect, the invention provides a computer program carried on a computer readable medium which when executed on a media gatekeeper type device in an IP telecommunications network causes the gatekeeper-type device to recognising that a called number cannot be resolved to an IP address, and generate a failure message indicating the call cannot complete and including an enhancement indicator.

In another aspect, the invention provides a computer program carried on a computer readable medium which when executed on a media gateway device in an IP telecommunications network causes the gateway device on receipt of a failure message indicating the call cannot complete and including an enhancement indicator, to determine which action to take in response to the failure message chosen from the group of acting in response to the failure message and acting in response to the enhancement indicator.

Other aspects and features of the present invention will become apparent to those ordinarily skilled in the art upon review of the following description of specific embodiments of the invention in conjunction with the accompanying figures

DETAILED DESCRIPTION OF THE PREFERRED EMBODIMENTS

Figure 1:
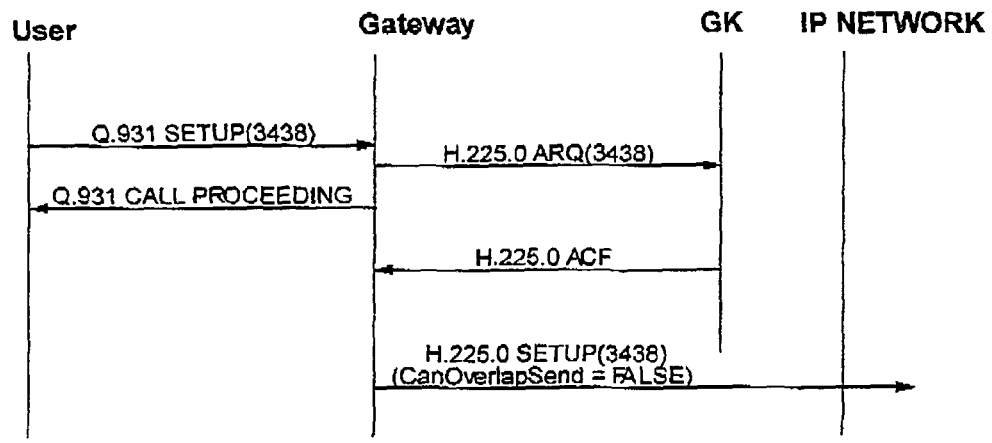
FIG. 1 is a schematic diagram of a prior art en bloc call flow with a local H.323 Gatekeeper.

Embodiments of the invention are described below. For reference, Table 1 provides a summary and glossary of the terms used within the description and claims.

TABLE 1

| Term | Description |
| --- | --- |
| En Bloc | All dialled digits are sent in the initial message capable of providing digits. There will be no further dialled digits provided. |
| Overlap | The dialled digits are presented in one or more messages; typically, there are at least two. (An overlap capable device may send all digits at once, acting as an en bloc device. The opposite is never true.) |
| H.323 | The prevalent ITU-T standard for IP telecommunications. |
| H.225.0 | The ITU-T standard defining the call control messages used for H.323. |
| H.245 | The ITU-T standard defining the messages used to control the Real Time Protocol streams for H.323. |
| Gateway | A device converting between two different media or between two different signaling protocols. In H.323, this is the device providing a conversion from an external medium such as analog data and signaling into IP, and vice versa. |
| H.323 Endpoint | An alternate name for an H.323 Gateway. |
| H.323 Gatekeeper | According to the H.323 model, this is an optional device used to provide admission control and address resolution in the network. Without it, every device needs to know the dial plan for the whole network. With it, all gateways query the gatekeeper to find destinations. |
| H.323 Admission Request (ARQ) | The H.323 (H.225.0) message requesting (a) permission to make a call and (b) the IP address of the destination associated with the address to be translated. |
| H.323 Admission Confirm (ACF) | The H.323 (H.225.0) message approving the call and sending the destination IP address. |
| H.323 Admission Reject (ARJ) | The H.323 (H.225.0) message rejecting an ARQ, with the indicated reason enclosed. |
| Direct Routed H.323 calls | The gateway sends the H.323 SETUP to the destination. The Gatekeeper provides address resolution, authentication, and approval. |
| Gatekeeper Routed H.323 calls | The gateway sends the H.323 SETUP to the Gatekeeper, which then sends it to the destination. The signaling is effectively tandem, although the media uses a direct path. |
| Media Gateway | A device converting between two different media or between two different signaling protocols. In SIP, MGCP, MEGACO (H.248) and other protocols, this is analogous to the H.323 Gateway. |
| Media Gateway Controller | This is the physical device controlling the Media gateways. Depending on the protocol, its capabilities range from "equivalent to the H.323 gatekeeper" to "gatekeeper plus call control". |
| SIP Redirect Server | The SIP server fulfilling an almost identical function to the H.323 Gatekeeper, when using direct routing. The major difference is in the messages used - an INVITE instead of the SETUP or ARQ, different call clearing messages instead of the applicable ARJ's, and a call redirection message instead of the ACF. |
| SIP Proxy Server | The SIP server fulfilling an almost identical function to the H.323 Gatekeeper, when using gatekeeper routing. The major difference is in the messages used - an INVITE instead of the SETUP, etc. |

As an introduction, normal operation of the SIP and H.323 protocols for en bloc and overlap calls is described below and with reference to FIGS. 1 to 11.

H.323 is used for the majority of the examples described below. It will be appreciated that other protocols such as SIP or MGCP may be used instead. However the examples are easier to understand with H.323 since SIP and other protocols tend to use the same messages for different purposes under different cases.

Conventional En Bloc Originated Calls

Figure 2:
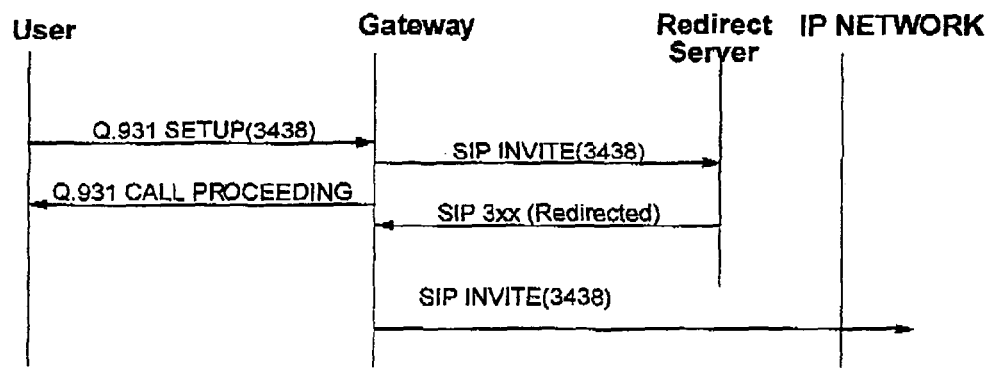
FIG. 2 is a schematic diagram of a prior art en bloc call flow with a local SIP Redirect Server.
Figure 3:
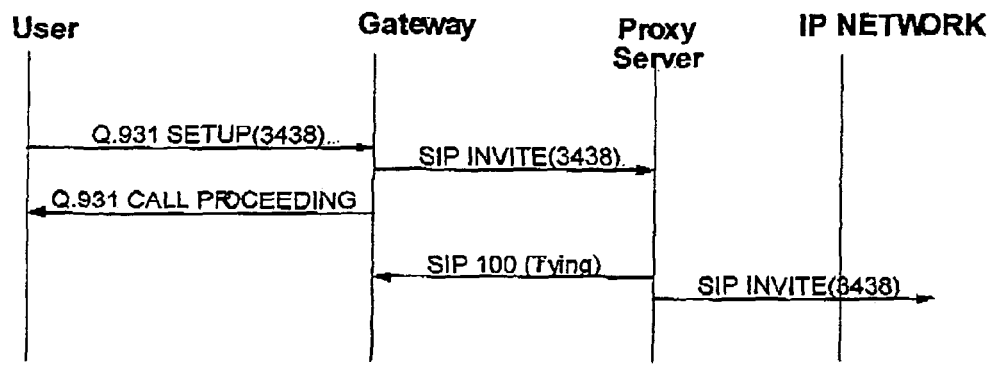
FIG. 3 is a schematic diagram of a prior art en bloc call flow with a local SIP Proxy Server.

An en bloc originated call may be received on an overlap capable gateway. Three possible scenarios are shown in FIGS. 1 to 3.

All call flow figures show the "half call" model. Also, only 'Direct routed' calls are discussed here. The reader can extract the information from the following message flows by merging the "IP Network" and the "GK", though, as all signalling in a gatekeeper routed call passes through the gatekeeper, or may apply the SIP Proxy Server model. Effectively, there is a one to one mapping of messages in that scenario when the gateway registers with the gatekeeper and is pre-granted authorization.

Reception on the overlap capable gateway may be achieved by the user dialling the octothorpe ("#") to indicate end of dial or the switch or the device originating the call may determine end of dial through digit analysis. It may then send an indication. For example, a Q.931 ISDN to IP gateway may send a "Sending Complete" Information Element (IE). An example is using IP in North America to provide an alternate carrier avoiding traditional long distance carriers, in a toll bypass scenario.

Alternatively the original call (for example, the SETUP at the Q.931 to IP gateway) may include all digits, but not indicate end of dial; however, that is an exception case of "overlap to en bloc".

With an overlap capable gateway, at times the call can be said to be "forced to go as an en bloc call". Thus, assuming that a Q.931 ISDN to H.323 gateway is handling a call, if the Q.931 SETUP indicates "end of dial" no more digits may be received. Therefore, the gateway replies with a Q.931 CALL PROCEEDING and not a Q.931 SETUP ACKNOWLEDGE.

The H.225.0 SETUP (or SIP INVITE, or . . . ) message indicates if the messaging is overlap or en bloc. Based on the received message the destination can respond with either a message enabling overlap or en bloc.

For SIP, only a single INVITE is sent. This either results in a 4xx clearing the call, or leads through one of several flows to a 200 (Answered).

Conventional Overlap to Overlap Calls

This scenario requires overlap capable devices on both sides of the call. Overlap origination has two main flavours. Overlap receiving capability is needed at both the Gatekeeper (or other servers) as well as Destination gateway.

All call flow figures show the "half call" model.

Note: Only 'Direct routed' calls are discussed here. The reader can extract the information from the following message flows by merging the "IP Network" and the "GK", though, as all signalling in a gatekeeper routed call passes through the gatekeeper.

Generally gatekeeper address resolution using the Admission Request (ARQ) (or SIP INVITE to the Redirect Server or equivalent) might not succeed on the first attempt. If not, it is achieved through repeated ARQ messages. In addition, sometimes digits arrive in a state that requires the gateway to buffer them, pending the response message from the gatekeeper regarding the transmitted ARQ.

Figure 4:
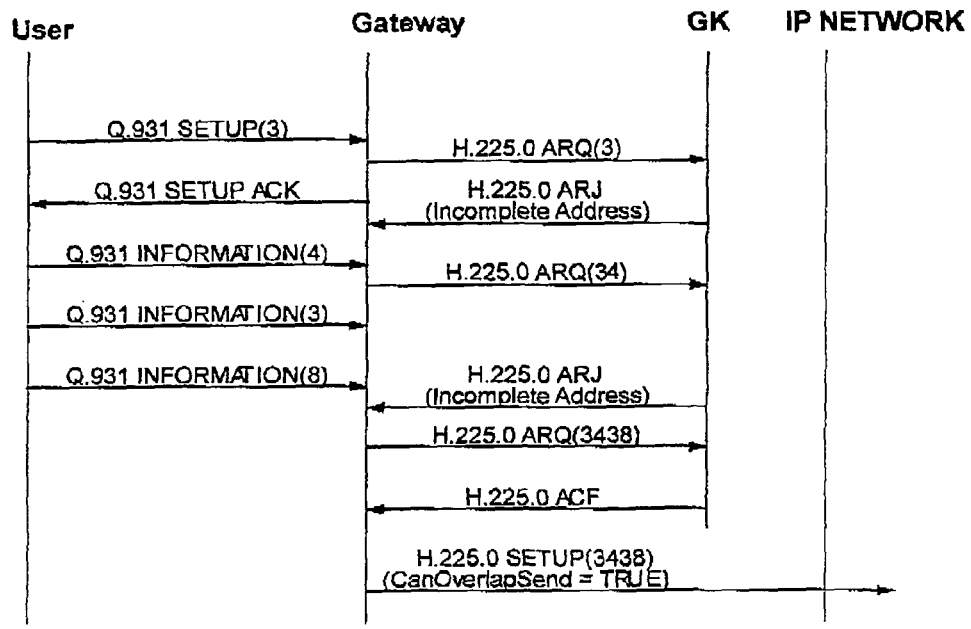
FIG. 4 is a schematic diagram of a prior art overlap call flow with a local Gatekeeper.

FIG. 4 illustrates this using a Q.931 ISDN to H.323 gateway example. The initial Q.931 SETUP had too few digits. The gatekeeper replied with an ARJ, indicating incomplete address. Subsequent INFO messages are received, ARQs sent, and rejected, until enough digits have been received to find the destination.

Figure 5:
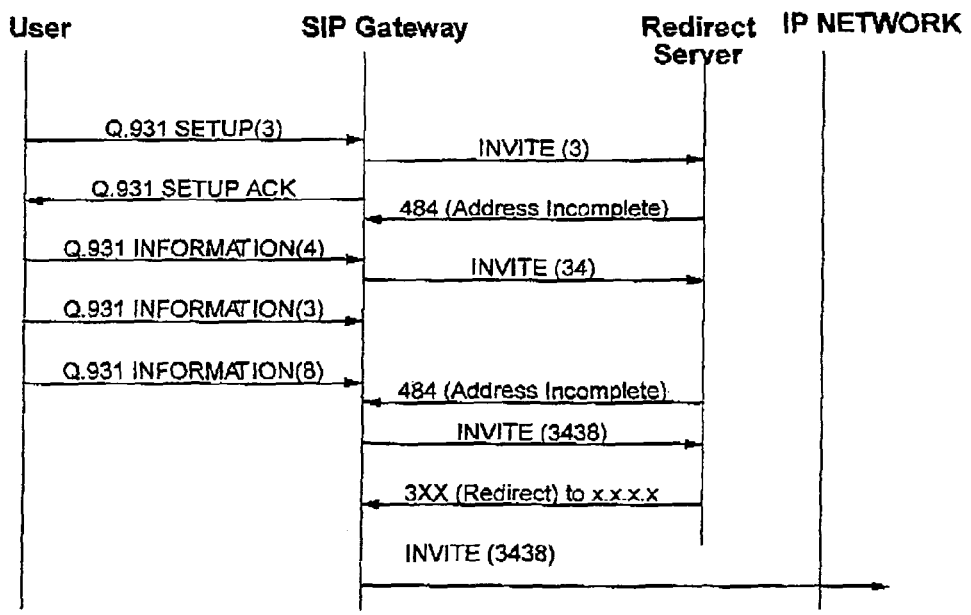
FIG. 5 is a schematic diagram of a prior art overlap call flow with a local SIP Redirect Server.
Figure 6:
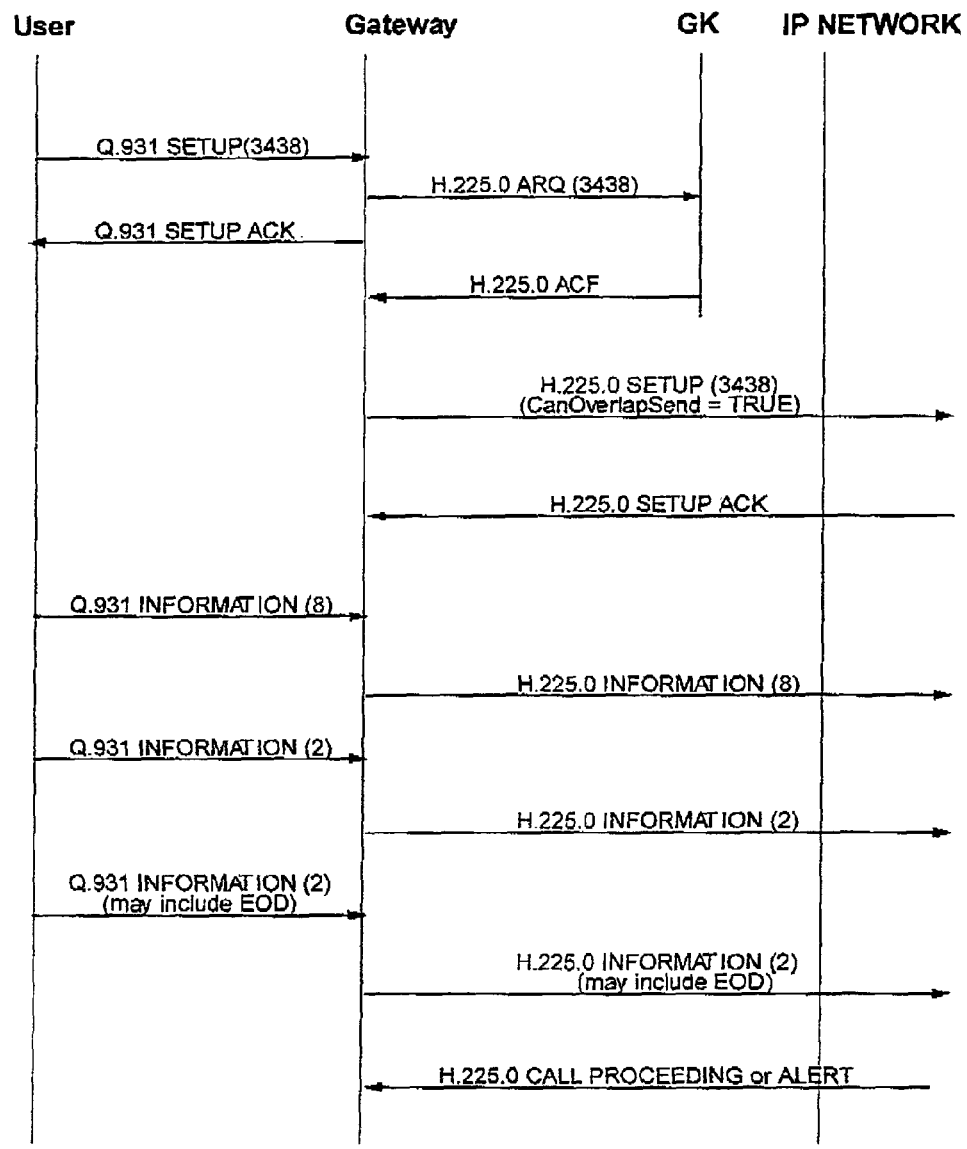
FIG. 6 is a schematic diagram of a prior art normal call flow at the originating side, with simple H.323 overlap.

With reference to FIG. 5, the SIP Redirect Server uses almost exactly the same message flow with a Q.931 to SIP gateway.

Either the call may be simple overlap, where the gateway receives and processes the initial call attempt by the user up to and including identifying the remote destination before the first subsequent digit, or the overlap may be more complex. This is explained in more detail below.

The message shown as "SETUP(3)" means the SETUP message contains called party number as "3". "SETUP (3438)" has called party number "3438".

Simple H.323 Overlap

"Simple" overlap signalling does not require storage of additional digit information received in between a message sent by the gateway to the IP network and any responses. Simple overlap signalling can be shown in the call flow of FIG. 6. Note that end of dial may be indicated by the originator (in which case one final message indicating end of dial passes to the terminating gateway) or the destination may return end of dial—an H.225.0 CALL PROCEEDING, ALERTING, or CONNECT.

After the ARQ/ACF (admission request/confirm handshake), the Gatekeeper is no longer involved in this call. Call control messaging—the H.225.0 SETUP, SETUP ACKNOWLEDGE, INFO, and so forth—flow directly between the two gateways, unless gatekeeper routing is used. In that case, the gatekeeper acts as a signalling tandem between the two gateways.

The numbering plan information (NPI, type of number (TON) etc.) is included in every H.225.0 INFORMATION message along with the digits sent.

The EOD indication can be sent through an INFORMATION message if the user presses '#' or the interdigit timer times out. However it is optional because, in most cases, the originating end receives an ALERT message before the interdigit timer times out.

Figure 7:
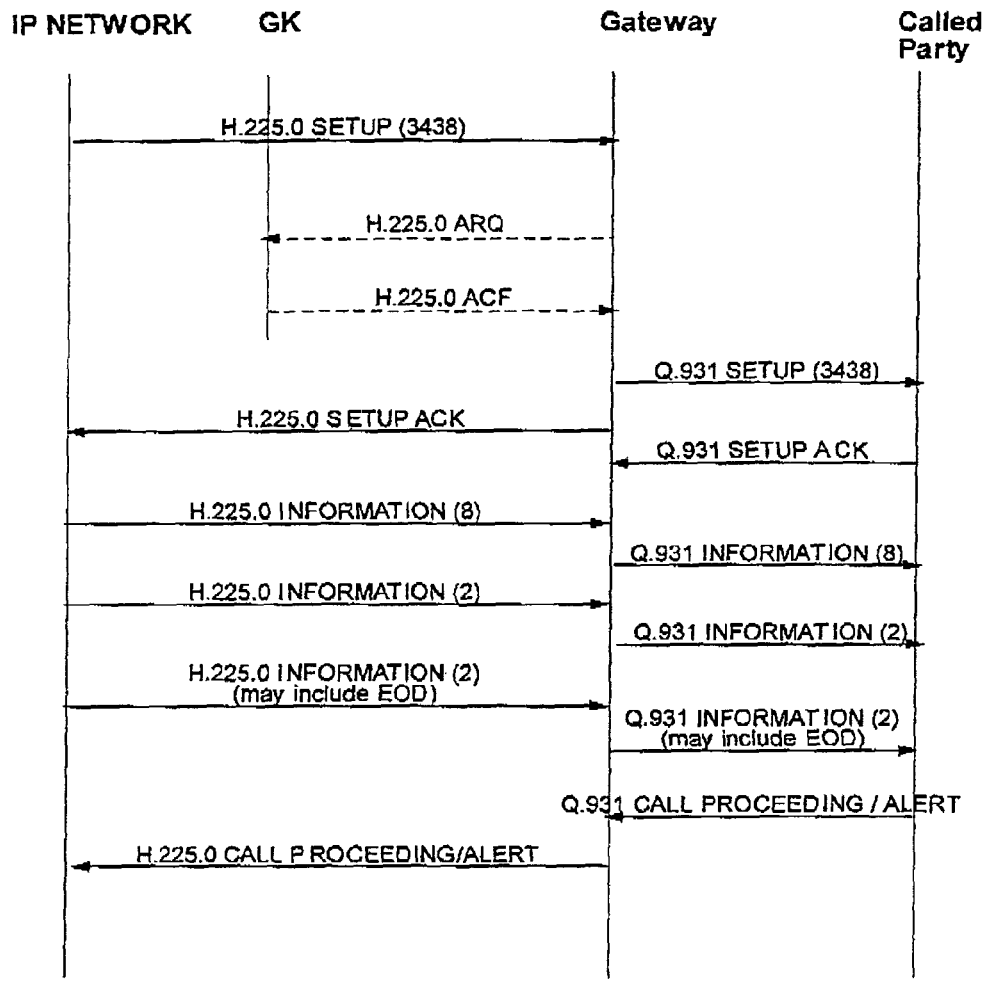
FIG. 7 is a schematic diagram of a prior art normal call flow at the destination side, with H.323 overlap.
Figure 8:
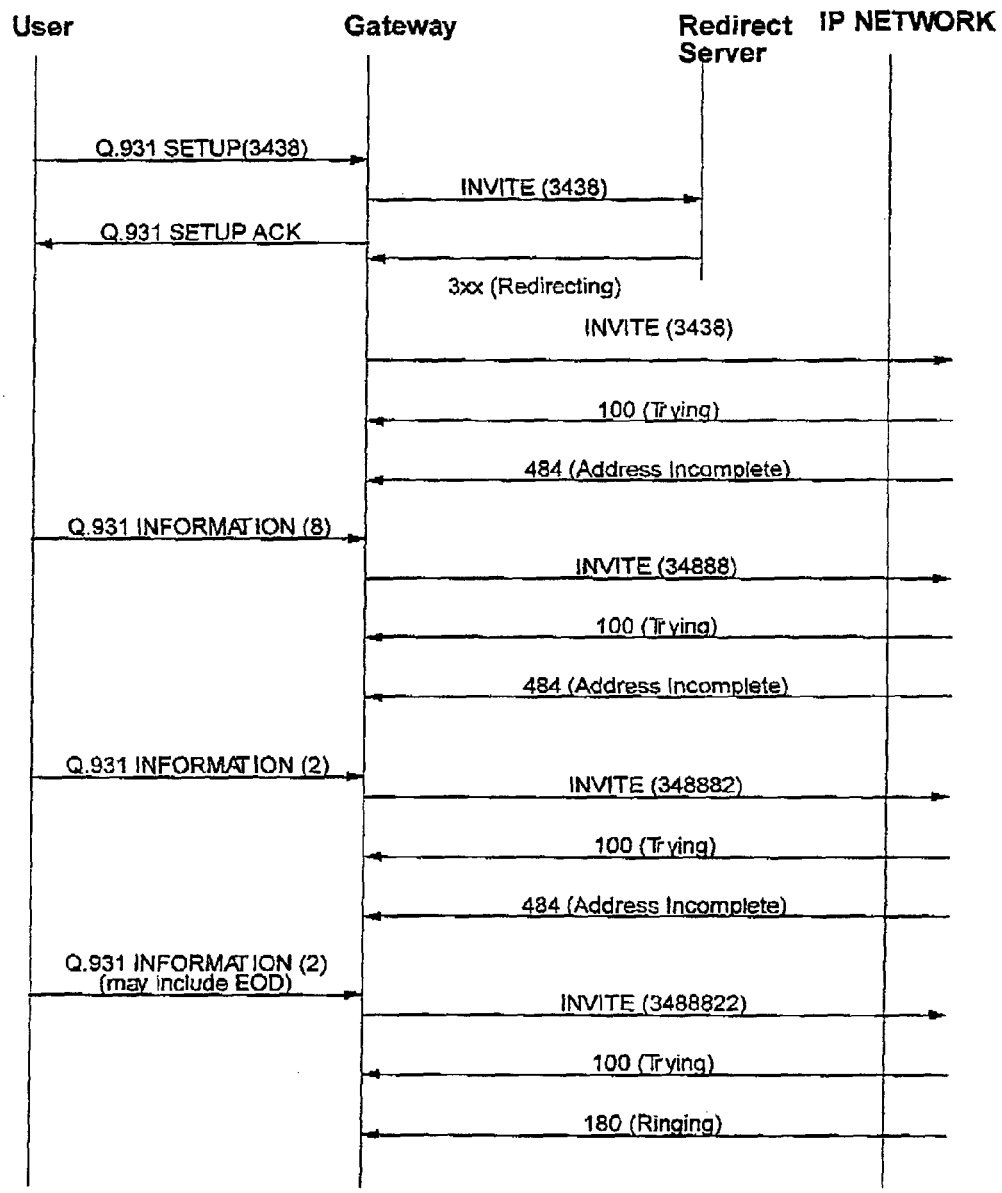
FIG. 8 is a schematic diagram of a prior art normal call flow at the originating side, with simple SIP overlap with Redirect Server.
Figure 9:
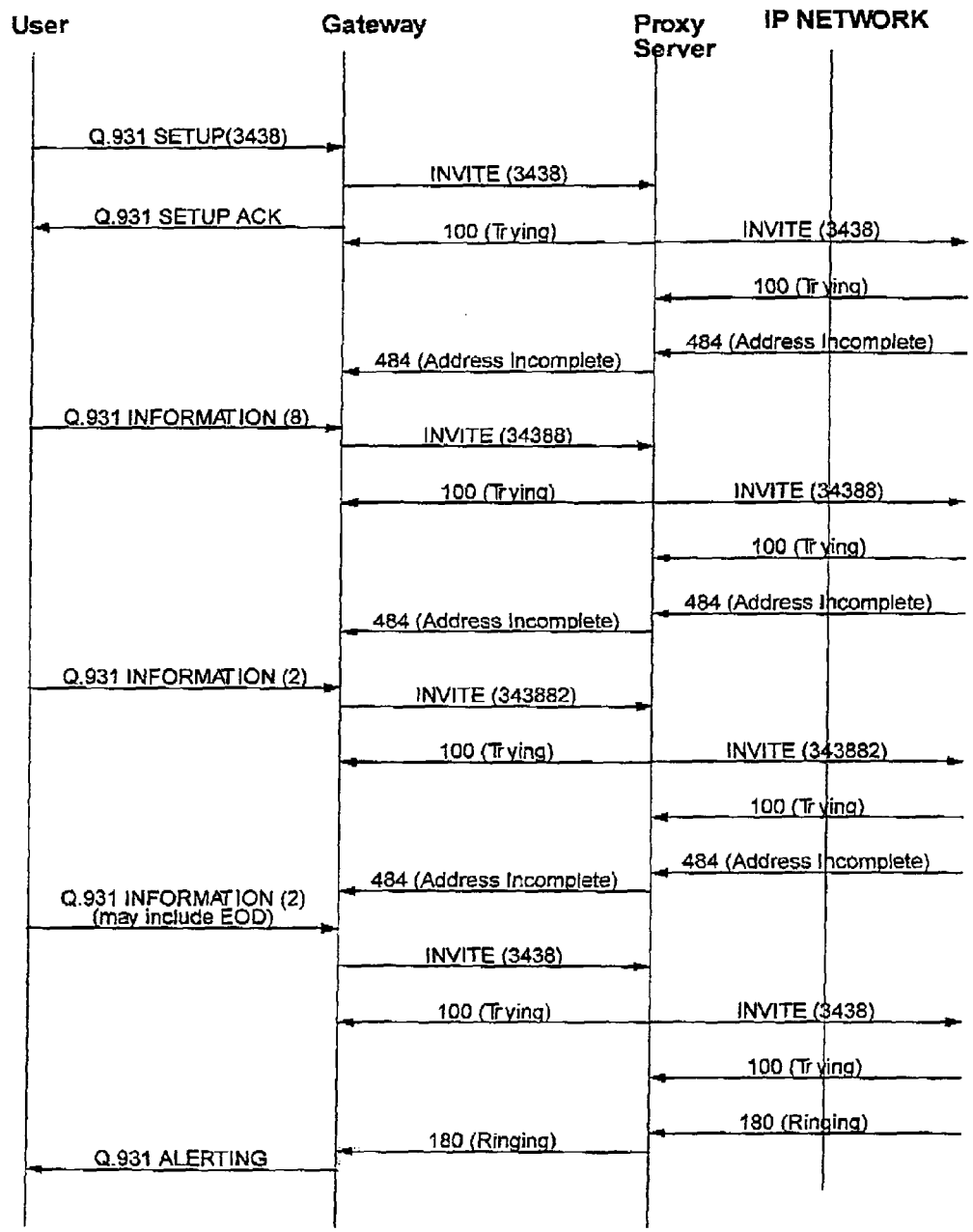
FIG. 9 is a schematic diagram of a prior art normal call flow at the originating side, with simple SIP overlap with Proxy Server.

With reference to FIG. 7, at the destination side, the ARQ/ACF is optional (not used, if the gateway has been told to use pre-granted ARQ by the gatekeeper during registration). If it is used, the Gatekeeper typically only looks at IP addresses. On receiving the ACF (or immediately, if no ARQ was needed) the gateway initiates overlap sending.

Simple SIP Overlap

SIP overlap implies re-attempting the call until either a failure is declared (the clearing message is NOT 484 (Address Incomplete)) or the call succeeds. Although there is a small difference in the handling based on Proxy versus Redirect Server, the major difference is after the determination of the destination. That part either uses a tandem approach like H.323 Gatekeeper Routing (the Proxy Server) or a direct signalling approach like the H.323 Direct Routing (the Redirect Server).

On the originating side, two very similar approaches apply. These are shown for a redirect server and for a proxy sever in FIGS. 8 and 9 respectively.

Figure 10:
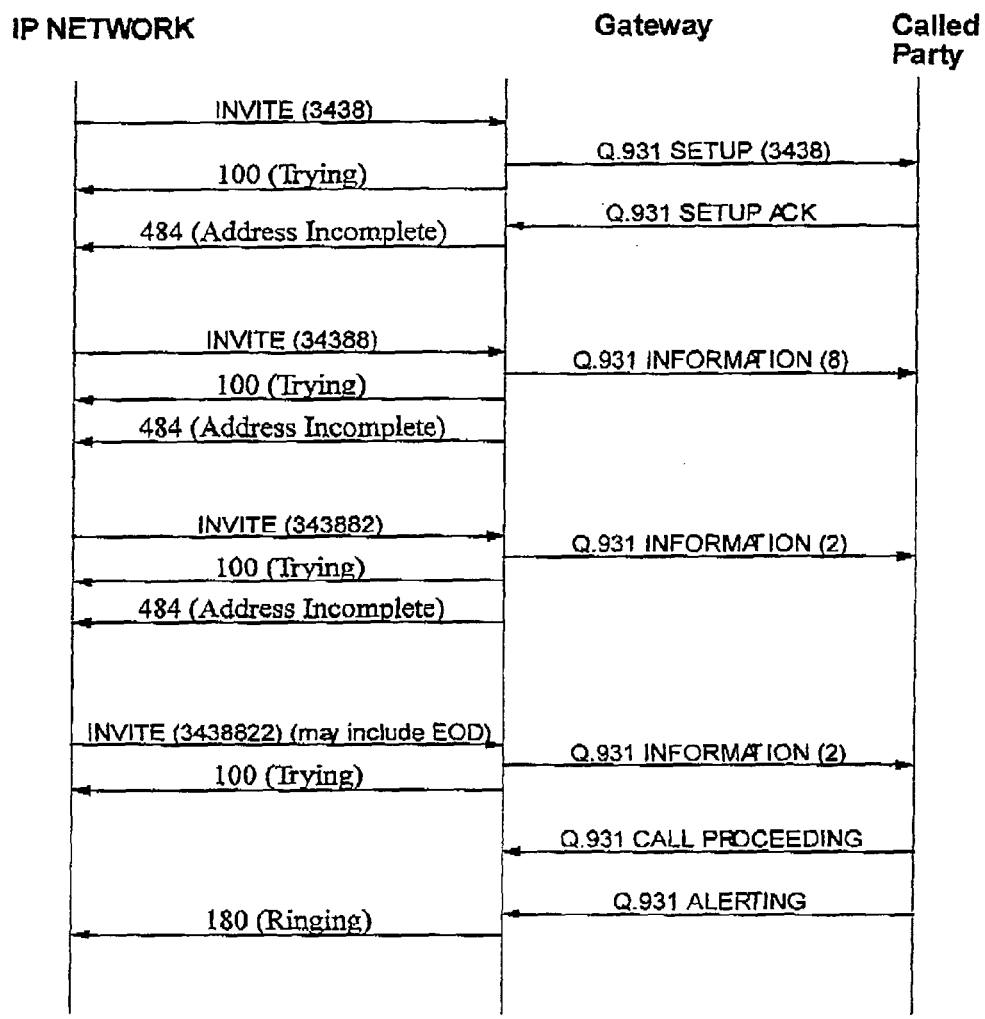
FIG. 10 is a schematic diagram of a prior art normal call flow at the destination side, with SIP overlap.

At the destination side, SIP is simpler than H.323; because the servers had to authorize the call, no destination admission query is needed. This is illustrated in FIG. 10.

Complex H.323 Overlap

Simple overlap has simple message to message mapping. Complex overlap results in messages being received by the gateway including digits, resulting in digit storage. That is, during the call flow an INFORMATION message is received with one or more digits, but no H.323 message can be sent at this time, so the message data must be stored until it can be used.

Figure 11:
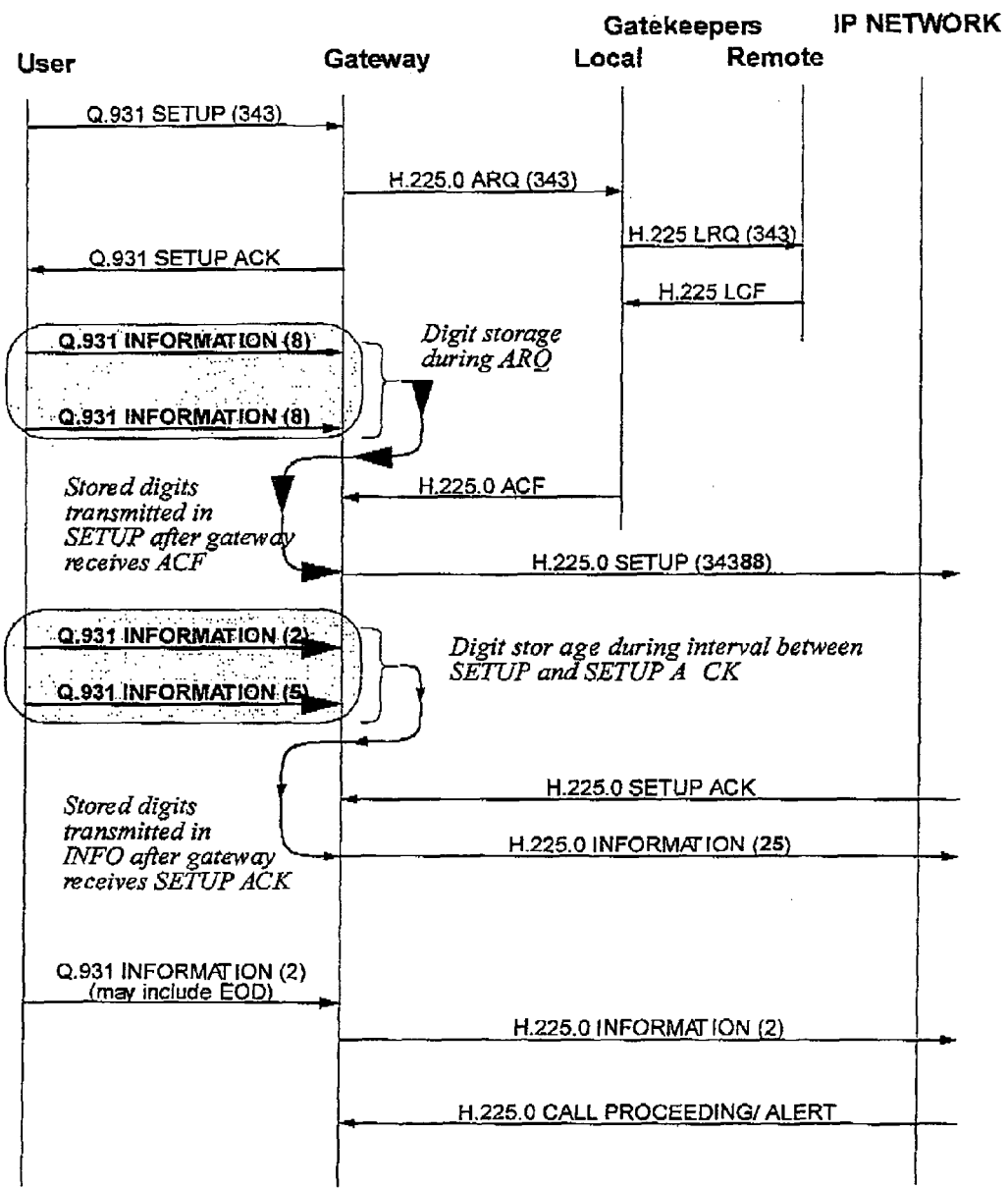
FIG. 11 is a schematic diagram of a prior art originator call flow for H.323 overlap when digit storage is needed.

FIG. 11 illustrates this concept.

If an ARQ was sent to the gatekeeper, the gateway must wait for an admission reject (ARJ) to send another ARQ, or an ACF to insert the digit into the dialled number of the SETUP prior to transmitting it. Therefore, the gateway stores the digit. (The most common cause resides within the "location request (LRQ) and responses" scenarios. Because the local gatekeeper queried its peers, the interval between the ARQ and ACF is much larger.)

On the other hand, if a SETUP was sent by H.323 to the destination and no response received yet (or overlap to en bloc initiated . . . ) the gateway must buffer this information as well, prior to sending it in a concatenated INFO message (if overlap is indicated by a SETUP ACK response) or in an overlap to en bloc SETUP.

The simplest way to trigger complex overlap is a multiple gatekeeper zone network set up, where multiple Gatekeepers have their own end-points (or gateways). Since a gateway "A" may register with Gatekeeper "X" while gateway "B" registers with Gatekeeper "Y", an ARQ from "A" to "B" cannot be resolved by "X". Logically, the call could fail at this point. However, another aspect of H.323 permits the call to proceed.

If Gatekeeper "X" knows of the existence of Gatekeeper "Y" and both support querying another Gatekeeper to find the location of a gateway, Gatekeeper "X" may send a Location Request to all Gatekeepers supporting this capability. However, this takes time, and therefore an INFO message carrying a digit may be received prior to the response.

Assuming that more than one Gatekeeper exists to reply, the number resolves to only one. All Gatekeepers other than the "correct one" may reply with a Location Reject (LRJ).

However, responding is optional; the originating gatekeeper may have a timer expiry to determine that an ARJ needs to be returned to the gateway.

As with simple overlap, end of dial indications cause the gateway to end overlap dialling.

With reference to FIG. 11, two digits—8 and 8—are received while waiting for the ACF, from the local Gatekeeper. When the ACF is received, the H.225.0 SETUP includes all digits received to date, including the "88" received in Q.931 INFO messages from the caller.

Similarly, two digits—2 and 5—are received after the H.225.0 SETUP was sent, but before the SETUP ACK was received. These are held until the SETUP ACK comes back, and then sent.

The destination side is unaware that the call is complex at the originator; the originator handles this to make it look identical to the normal case. Also, the interval between ARQ and ACF can be small enough that to the user it is impossible to tell the difference between storing digits during the ARQ/ACF interval and storing digits between the H.225.0 SETUP and H.225.0 SETUP ACK interval. Normally, the difference is invisible except when using expert level debugging tools.

Complex SIP Overlap

Strictly, this does not exist. Every new digit triggers a new INVITE. As the messages are sent over transport control protocol (TCP), the infrastructure provides sequencing, so an INVITE that was transmitted prior to another INVITE, but received late, is ignored.

As multiple outstanding INVITE messages are allowed, it is only when the last one sent has been cleared or an INVITE results in a call that the system worries about the extraneous INVITEs. It cancels all outstanding requests, based on the final result.

The improved handling of calls in accordance with the invention is now described below.

Overlap Originated Calls to En Bloc Destinations

It should be noted that overlap to en bloc handling is not usually available if the destination provides a means to attempt completion of calls to incomplete/invalid numbers by rerouting the call to some form of interception station. A solution to this issue is described below.

Sometimes the H.225.0 SETUP or SIP INVITE for an overlap capable call reaches a destination that is en bloc. Two procedures can occur at the destination to handle this: either an H.225.0 CALL PROCEEDING (or SIP 100 (Trying)) indicating end of dial followed by call clear indicating incomplete number may occur in response to a SETUP (or INVITE), or the call may clear immediately indicating incomplete number. If the SIP clearing message is a 484 (Address Incomplete), the call becomes a form of overlap handling, as the destination retries the call at each INVITE.

At this point, assuming that the call cleared indicating implicitly a lack of overlap capability, the overlap to en bloc enhancement becomes active.

Using a SIP 404 (Not Found) or some other clearing message that shows that the call has not reached the destination instead of the 484 (Address Incomplete) allows the originator to trigger a mechanism that is "more clever" than the "resend/resend/resend" of SIP overlap. For overlap to en bloc conversion this is a required trigger. The discussion below assumes that the 404 message is sent instead of the 484.

In both SIP (when the call clears with a message other than the 484) and H.323 cases, overlap to en bloc conversion begins. Timing starts and digits are collected until an end of dial indication (which could be either a protocol related timer, or some indicator within the messages providing the digits to the gateway). At that time, the gateway sends a new H.225.0 SETUP or SIP INVITE with all received digits. All further call processing occurs as per the standards for an en bloc call.

Overlap to en bloc conversion between two H.323 end points cannot occur when the original call began overlap signalling, or when the call actually terminated on a user terminal. That is, The H.225.0 SETUP was sent to the destination, but none of the following messages were received:
  H.225.0 SETUP ACKNOWLEDGE—an overlap call has been accepted
  H.225.0 FACILITY (Call Redirection)—the call is redirecting and a fresh attempt being made to a different gateway
  H.225.0 ALERTING or CONNECT—the call terminated on a user device
  Call clearing indicating protocol failure, busy destination, or other situation that converting to en bloc cannot resolve—no retry will succeed so the call fails immediately The SIP INVITE was sent to the destination, but none of the following messages were received:
  484 (Address Incomplete)—overlap is attempted
  3xx (Redirection)—the call is redirecting and a fresh attempt being made to a different gateway
  180 (Ringing) or 200 (Answered)—the call terminated on a user device
  Call clearing indicating protocol failure, busy destination, or other situation that converting to en bloc cannot resolve—no retry will succeed so the call fails immediately.

The normal case will have the destination gateway return one of the following:
  An H.225.0 RELEASE COMPLETE message with suitable trigger causes or Release Complete Reason. As a minimum, the causes are:
  cause 28 (0x1C)—'bad Address Format'
  cause 1 (0x01)—'unassigned number'
  The reasons include as a minimum:
    badFormatAddress
    may include neededFeatureNotSupported, as the overlap feature may need to be supported to accept an overlap call
  A SIP clearing message of a suitable trigger type. As a minimum, the types are:
    404 (Not Found)
    406 (Not Acceptable)
    485 (Ambiguous)
    488 (Not Acceptable Here)

Receipt of one of these triggers results in the originator collecting digits, receiving an end of dial indication, and then retrying the call. The sequence is:

1. Send the initial network message (H.225.0 SETUP, SIP INVITE)
2. Potentially, receive a response that is ambiguous (H.225.0 CALL PROCEEDING, SIP 100 (Trying)):
   a) If the next message indicates overlap signalling failure (trigger message), trigger overlap to en bloc.
   b) If the next message indicates that the call succeeded (forward going message such as H.225.0 ALERTING or SIP 180 (Ringing)), send the original message followed by the message received to clarify the ambiguity.
   c) If the next message indicates call failure, clear the call.

2. If no ambiguous message intervened, and the next message indicates overlap signalling failure (trigger message), trigger overlap to en bloc conversion.

This is described in more detail below.

H.323 Flows

Figure 12:
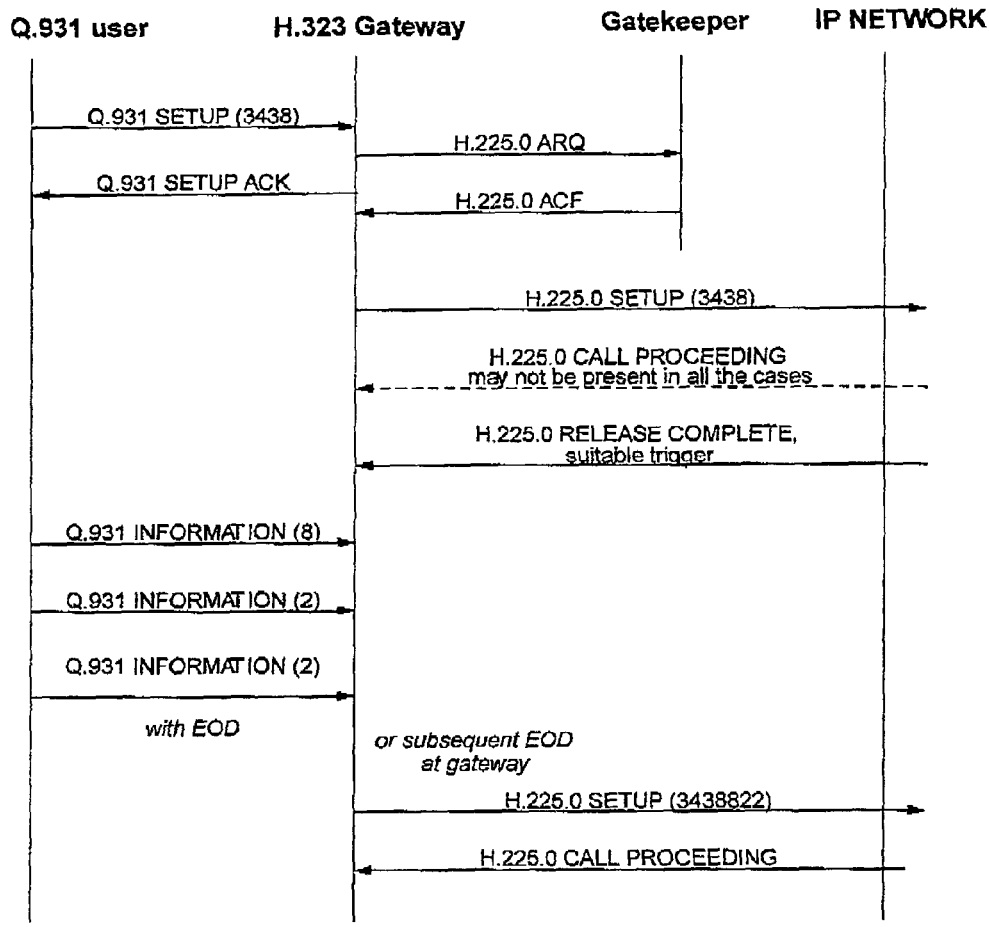
FIG. 12 is a schematic diagram of an H.323 originator call flow to an en bloc destination.

With reference to FIG. 12, the destination rejects the call with a suitable trigger the originator collects digits and retries.

Figure 13:
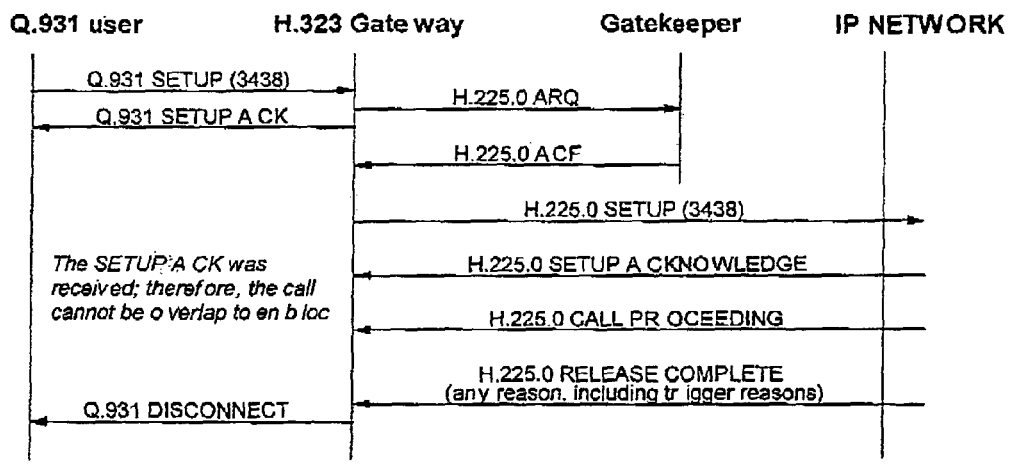
FIG. 13 is a schematic diagram of an H.323 call flow to an overlap destination, cleared after CALL PROC.

Note that an H.225.0 CALL PROCEEDING followed by a RELEASE COMPLETE is not an automatic indication of "overlap to en bloc". If the sequence is "SETUP out, SETUP ACK in, CALL PROCEEDING in, and RELEASE COMPLETE in", the destination accepted the overlap call, decided no more digits were needed, and then cleared the call. This is a valid overlap case that can happen easily with a destination tandem clearing for some reason such as "user busy", "barred due to class of service", and so forth. This is shown in FIG. 13.

Figure 14:
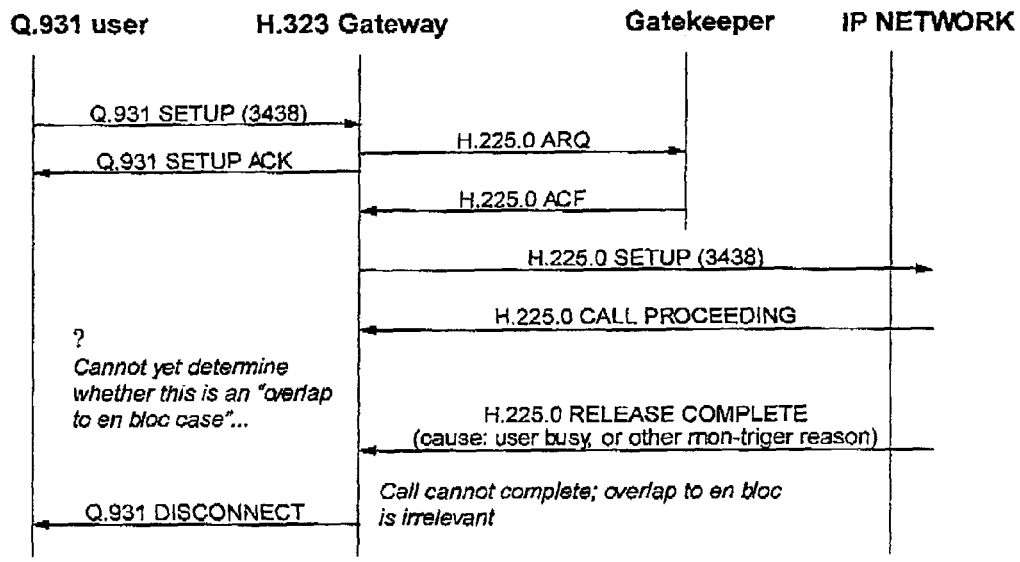
FIG. 14 is a schematic diagram of an H.323 call flow, SETUP ACK "skipped", call cleared.

With reference to FIG. 14, similarly, if the call starts like the overlap to en bloc case but clears for another reason, the call cannot be overlap to en bloc. Call clearing proceeds. Again, this valid case is caused by gateways determining that the number is valid, but then finding out that something blocks the call. For example, the cause code "user busy" triggers call clearing after a CALL PROCEEDING.

Figure 15:
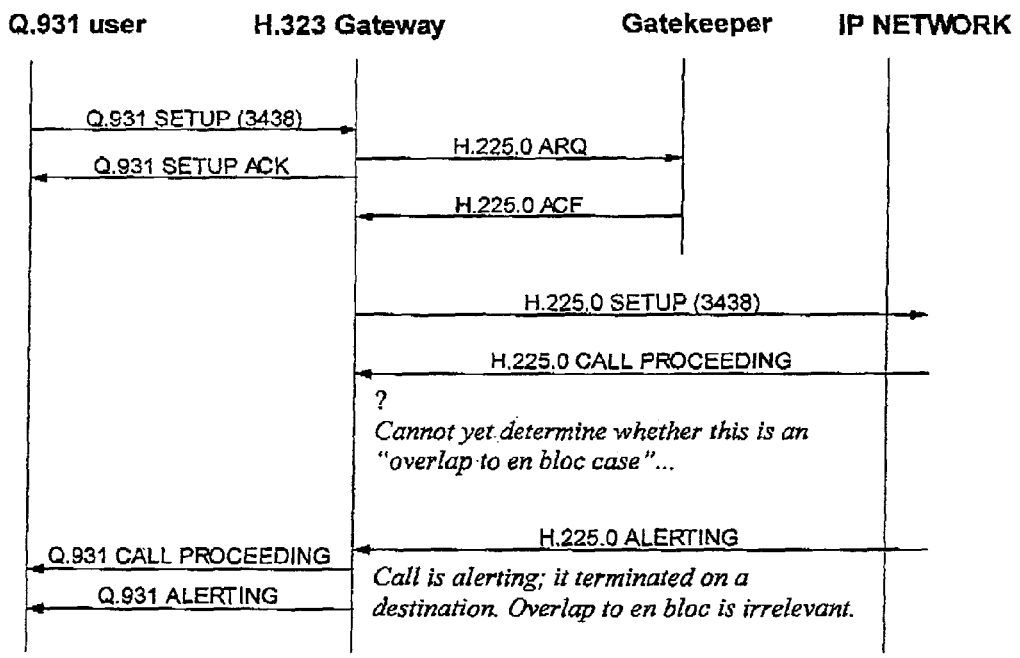
FIG. 15 is a schematic diagram of an H.323 call flow, SETUP ACK "skipped", ALERTING received.

Finally, gateways may consider the H.225.0 CALL PROCEEDING as a preliminary on the way to the ALERTING and bypass the SETUP ACKNOWLEDGE step. Until the ALERTING arrives, the originating gateway cannot differentiate between the two cases, but on receipt of the ALERTING the situation is clarified. This is shown in FIG. 15.

After the H.225.0 ALERTING is received, the signalling server sends both the CALL PROCEEDING and ALERTING, or—in the event of an H.225.0 CONNECT, a CALL PROCEEDING, ALERTING, and CONNECT.

SIP Flows

Redirect Server

Figure 16:
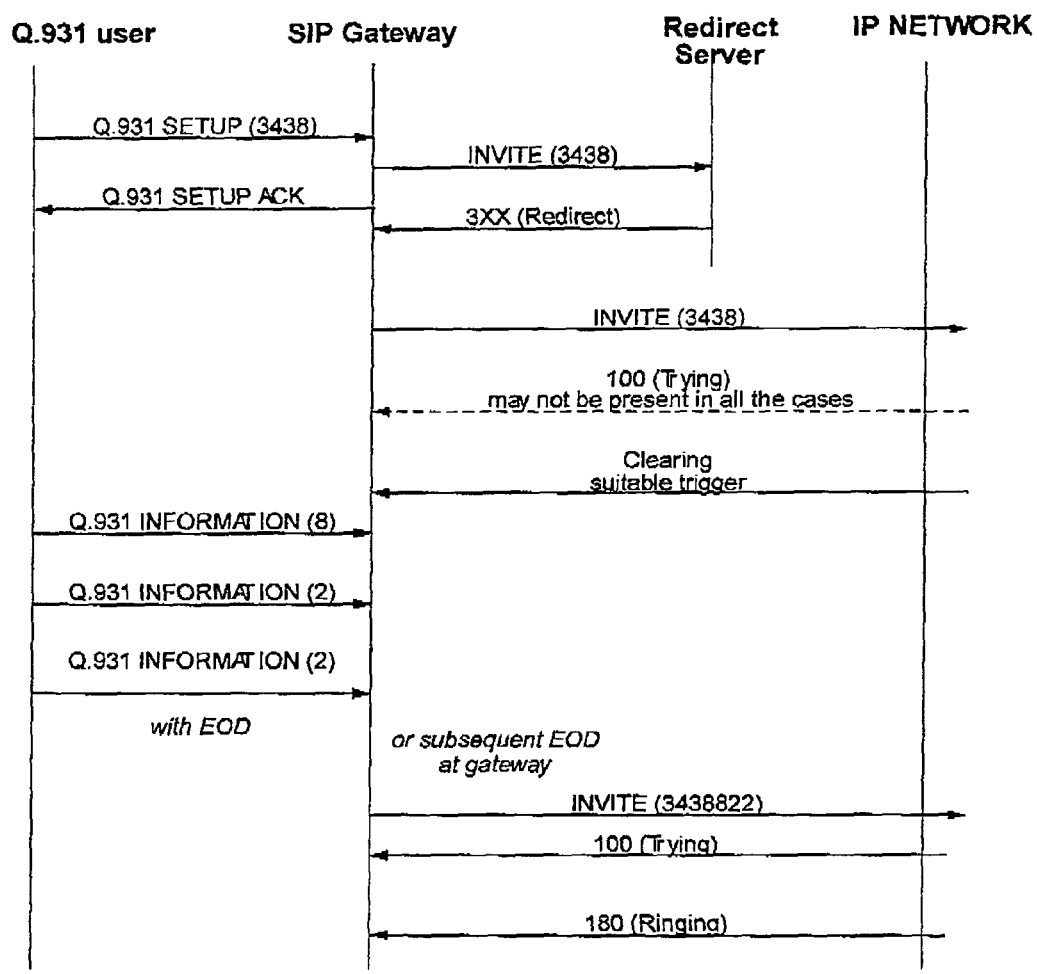
FIG. 16 is a schematic diagram of a SIP originator call flow to an en bloc destination.

With reference to FIG. 16, the destination rejects the call with a suitable trigger. The originator collects digits and retries. A 100 (Trying) followed by a clearing message with a valid trigger is an automatic indication of "overlap to en bloc". The 100 (Trying) is irrelevant to the flow.

Proxy Server

Figure 17:
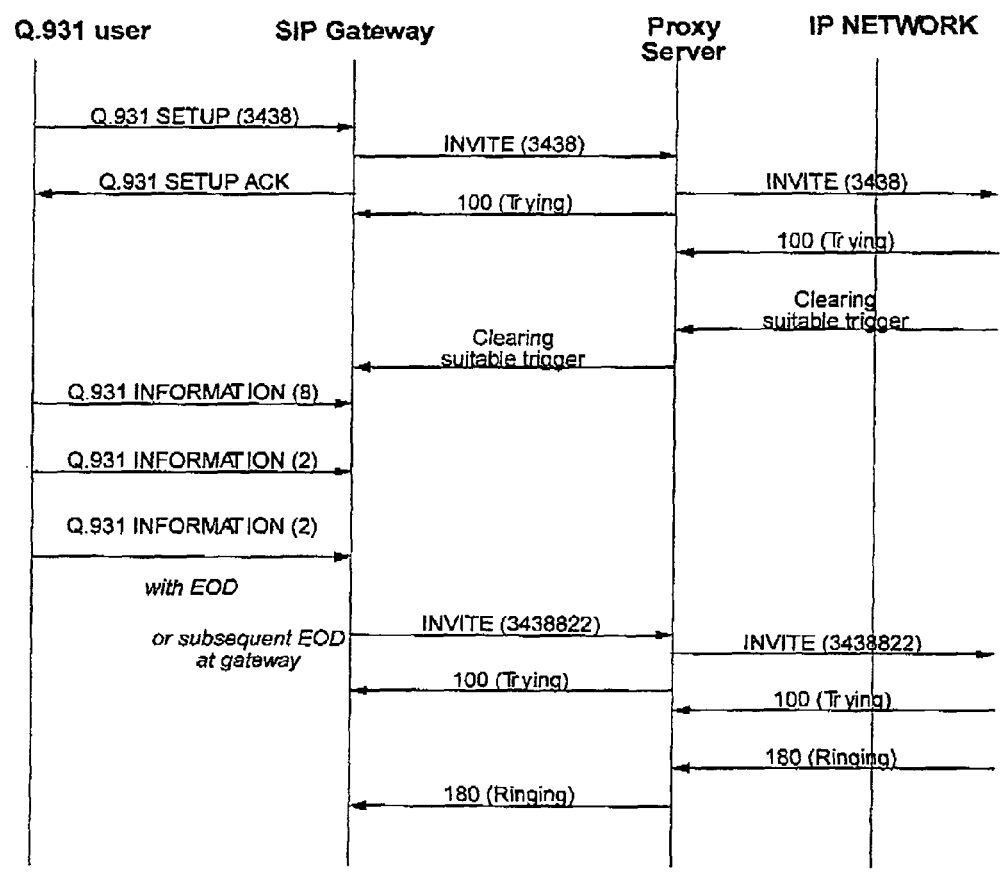
FIG. 17 is a schematic diagram of a SIP originator call flow to an en bloc destination.

With reference to FIG. 17, the destination rejects the call with a suitable trigger. The originator collects digits and retries. A 100 (Trying) followed by a clearing message with a valid trigger is an automatic indication of "overlap to en bloc". The 100 (Trying) is irrelevant to the flow.

As noted above, many gateways support a feature, referred to by several different names, which route a call that cannot terminate successfully with the digits as dialled to a centralized answering station. That routing capability is referred to here as "call interception".

Call interception can be triggered by several events, including:

incomplete number, without any ability to receive more digits invalid number destination is out of service permissions issues Call interception at the destination gateway and its impact on mixed networks of overlap and en bloc capable gateways is a capability under the control of the destination gateway. That is, if the gateway receives an overlap capable H.225.0 SETUP (meaning that the message indicates "canOverlapSend is True", and no end of dial indication such as the Sending Complete IE is present), and the gateway is en bloc only, either it has to be able to handle overlap to en bloc locally, it has to reject the call in a manner triggering overlap to en bloc, all calls to this destination for this number will intercept unless the number is complete, or all calls to this destination will fail unless the number is complete.

SIP avoids this issue as long as it does not intercept prior to the destination gateway; the destination gateway accepts INVITEs for overlap calls and replies with 484 (Address Incomplete) for incomplete numbers, or accepts what it thinks is an en bloc INVITE and rejects it with a 484 (Address Incomplete) for incomplete numbers.

In all cases, the destination gateway is the one that should be handling this number, so since most Directory Numbers use a prefix based format and these prefixes can be used for routing, a call to a completely dialled number terminating on a gateway can legitimately intercept.

With gatekeepers and servers, though, this becomes more complex. Any gatekeeper or server that provides an interception treatment (such as a default gateway, to which all unresolved calls route) could send the call to an unacceptable destination, tying up network resources and degrading performance of the network as viewed by the user. At the same time, it may be that no further handling can succeed, so it has to provide the originator with the intercept destination information.

The current protocols do not include a mechanism to address this, since the message returned to the originator looks identical to the H.323 ACF, SIP 3xx (Redirection), or successful call flow for a call to a resolved number.

A solution to this problem is set out below. This mechanism has two scenarios to consider—when the gatekeeper is providing intercept information and the gateway must use it rather than trying overlap to en bloc, or when the gatekeeper is recommending an intercept station, but retrying with added digits may result in a successful call.

Stand-Alone Servers and Gatekeepers

Figure 18:
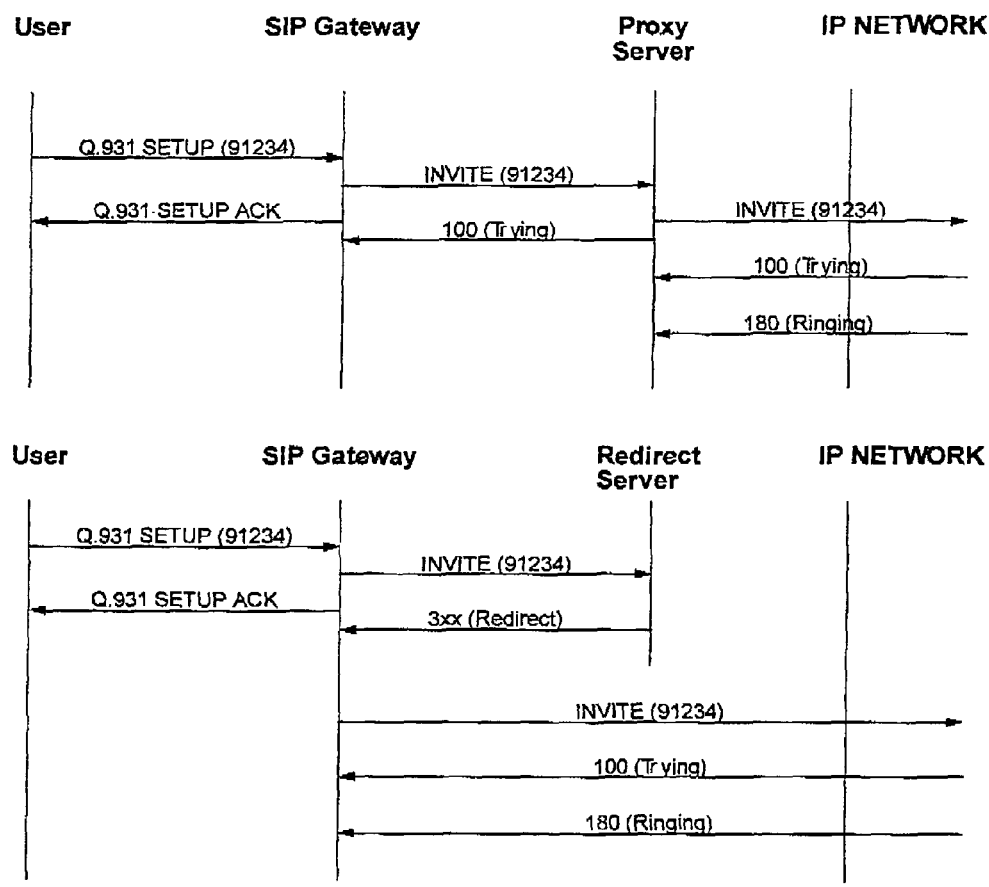
FIG. 18 is a schematic diagram of an originator call flow for SIP overlap to en bloc, intercepted call.
Figure 19:
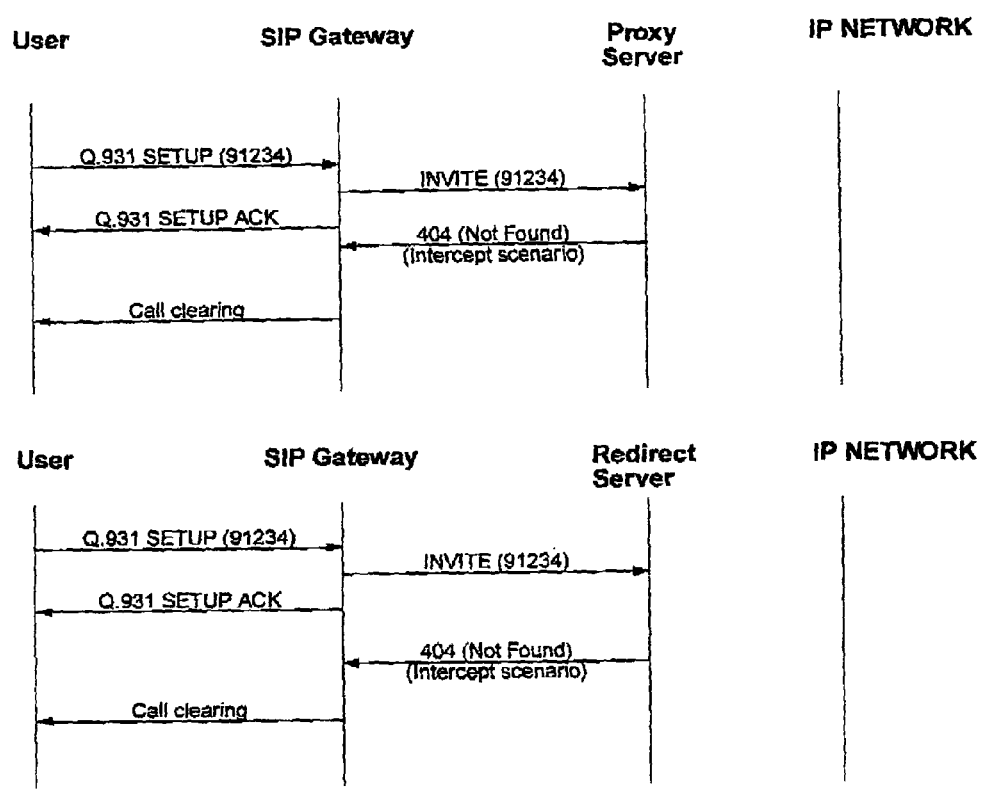
FIG. 19 is a schematic diagram of an originator call flow for SIP overlap to en bloc, intercepted call.
Figure 20:
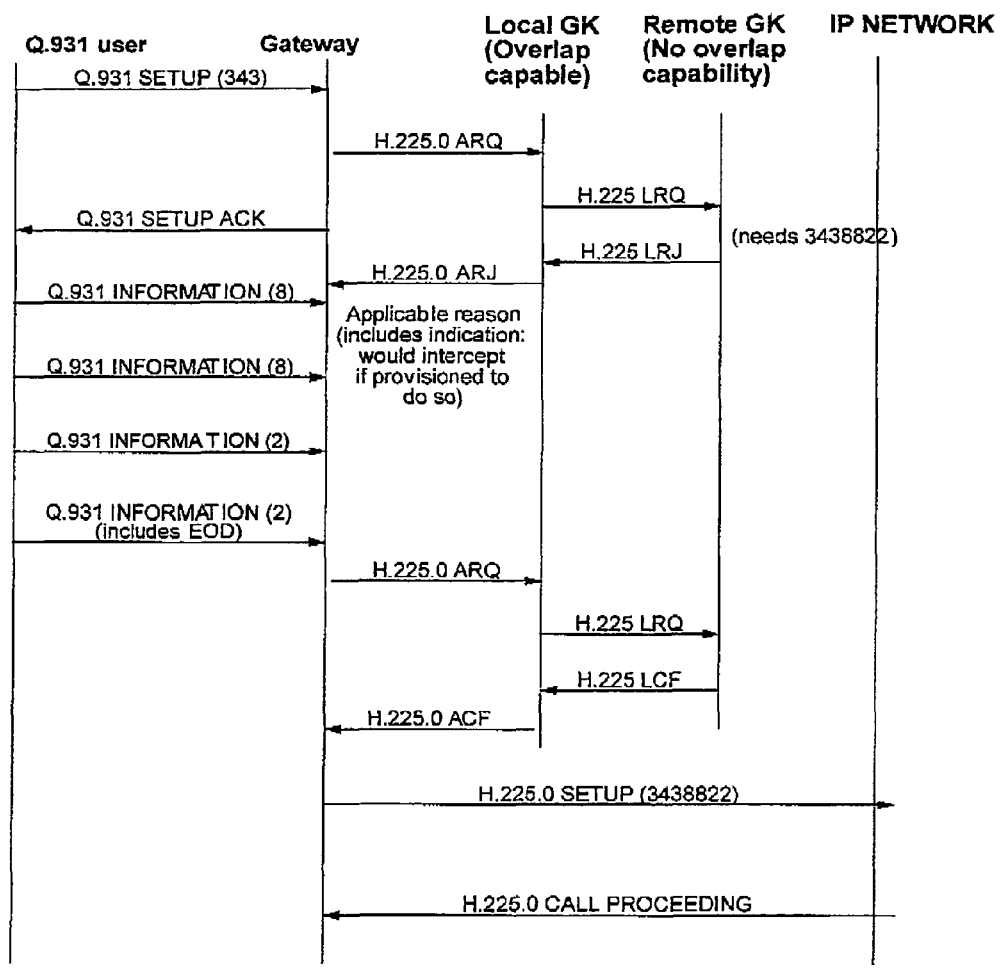
FIG. 20 is a schematic diagram of a originator call flow for H.323 overlap to en bloc, ARJ with trigger.
Figure 21:
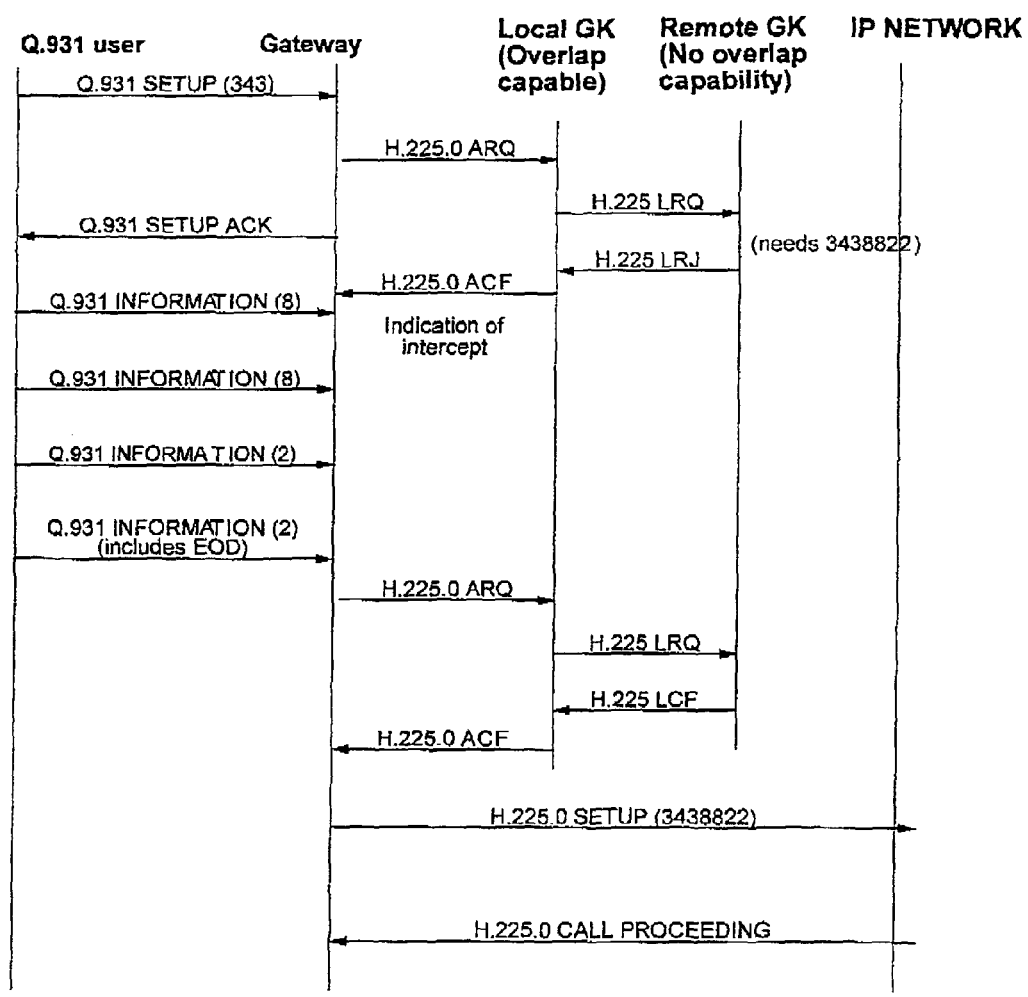
FIG. 21 is a schematic diagram of a originator call flow for H.323 overlap to en bloc, ACF with intercept trigger.

When the gatekeeper or server is stand-alone (meaning, there are no other gatekeepers or servers it can query for addresses it cannot resolve), interception is acceptable for all unresolved or unsuccessful calls. This is explained below with reference to FIGS. 18 and 19.

H.323

When a gatekeeper cannot resolve an address, it returns a failure message (the ARJ, or Admission Reject) or routes to an intercept destination. Possible causes for failure include:

1. the number is completely invalid
2. the number is a prefix of several valid destinations, but no more digits can be received There are other reasons for failure, such as "destination gateway out of service", but that implies a successful resolution of the destination address and thus these failure reasons are outside the scope of this invention.

When the number cannot be resolved, the local gatekeeper informs the gateway with either an ACF with an intercept destination, or an ARJ with the applicable clearing reason.

In this case, because the destination was unreachable and there is no value in re-attempting the call, redirecting the call to an intercept gateway is of value; the call may be able to progress using other media services such as circuit switched networks rather than remaining IP from end to end. The rationale is as follows:

If the number was invalid, it was not provisioned on the gatekeeper. Therefore, since there are no other gatekeepers to try, it is either a gap in the network administration or a mis-dialled number. In either case, human or other intercept treatment such as in Interactive Voice Response system on the intercept gateway can allow the call to proceed.

If the number is incomplete, the intercept gateway can also provide service.

If the destination gateway is out of service (possibly due to network congestion), but the user is still available through other means, the intercept gateway can route the call over other resources.

For all other reasons, it is better to allow a slight chance of successfully handling the call than to clear it outright.

In this case, any mechanism used to inform the originator of the possibility of a retry with more information should not be used. Further information will only result in finding the same condition, and therefore, the intercept station will be chosen again. If the gatekeeper returned a call clearing message, the gateway clears the call.

SIP

When a proxy or redirect server cannot resolve an address, it returns a failure message (typically the 404 (Not Found)) or routes to an intercept destination. Possible causes for failure include:

1. the number is completely invalid
2. the number is a prefix of several valid destinations, but no more digits can be received.

There are other reasons for failure, such as "destination gateway out of service", but that implies a successful resolution of the destination address and thus these failure reasons are outside the scope of this invention.

When the number cannot resolve, the redirect server either sends the call to the intercept gateway with a 3xx (Redirection) with an intercept destination, or clears with a valid message such as a 404 (Not Found). The proxy server passes the call to the intercept gateway, or clears with a valid message such as a 404 (Not Found). In this case, because the destination was unreachable and there is really no value in re-attempting the call, redirecting the call to an intercept gateway is of value; the call may be able to progress using other media services such as circuit switched networks rather than remaining IP from end to end. The rationale is as follows:

if the number was invalid, it was not provisioned on the server. Therefore, since there are no other gatekeepers to try, it is either a gap in the network administration or a mis-dialled number. In either case, human or other intercept treatment such as in Interactive Voice Response system on the intercept gateway can allow the call to proceed.

If the number is incomplete, the intercept gateway can also provide service.

If the destination gateway is out of service (possibly due to network congestion), but the user is still available through other means, the intercept gateway can route the call over other resources.

For all other reasons, it is better to allow a slight chance of successfully handling the call than to clear it outright.

The difference between H.323 and SIP is in the "failure" case. In the SIP case, the mechanism used to inform the originator of the possibility of a retry with more information is also the failure case, if the 404 (Not Found) is used. Further information will result in finding the same condition, but after overlap to en bloc conversion, the gateway clears the call.

This invention adds the transmission of an indicator in either a Header Part or Body Part of the SIP message indicating that a retry will also fail. This allows the originating gateway to fail the call immediately. This is a variant of the "Intercept station identifier" used for the multiple server network.

Networked Gatekeepers or Servers

With a network of gatekeepers or servers, interception to the intercept gateway should only be done when it is known that no gatekeeper or server can reach the destination. This is explained with reference to FIGS. 20 to 23.

H.323: Remote Gatekeepers and LRQ Related Call Failures

When a gateway normally registers to a specific gatekeeper but has not registered (or failed to register successfully), the highest probability is that the destination is out of service. It is unlikely that overlap to en bloc conversion can resolve this. Choosing to send an LRQ to another gatekeeper to allow one further try is a decision of the implementing gatekeeper, but the probability of success is slim. However, whenever a gatekeeper receives an ARQ for a gateway directory number that it does not know, it can forward this on.

Assume that a specific gatekeeper received a request for a specific DN it did not possess. When this gatekeeper exists within a network of other gatekeepers, it sends Location Requests (LRQs) to the peer gatekeepers about which it has information.

These may or may not succeed. Possible causes for failure include:

1. the number is completely invalid
2. the remote gatekeepers do not support H.323 version 4 and therefore cannot reply "incomplete address"
3. the remote gatekeeper supports version 4, but as overlap is optional the gatekeeper does not support it
4. messages lost or delayed in the network When this happens, with the current state of the art the local gatekeeper informs the gateway with either an ACF with the applicable data to send the call to an interception destination as provisioned, or sends an ARJ with the applicable clearing reason. However, the gatekeeper is unaware of the call state on the gateway. With overlap dialling, the call could still complete if more digits were received by the gateway, and sent in subsequent ARQ messages. Since the local gatekeeper cannot know the remote gatekeeper capabilities and protocol versions, a retry is of value. So, in the present invention, the local gatekeeper also provides an indication that the call may be able to succeed on retrying with more digits.

On receipt by the gateway application of this information, handling varies.

If no end of dial indicator has been received or an end of dial was received after more digits, the gateway enters an overlap to en bloc digit collection mode, collecting any digits received and waiting for the end of dial indication to send a fresh ARQ. Based on the response to the final ARQ, the gateway processes the response as received.

If an end of dial indicator has been received prior to the response from the gatekeeper, and no other digits arrived between the ARQ and the end of dial, it is pointless to wait longer. No more digits will come. The gateway ignores the indication that it can retry with more digits and processes the response as received, either accepting the ACF default route IP address, or clearing the call as per the ARJ reason.

SIP

Figure 22:
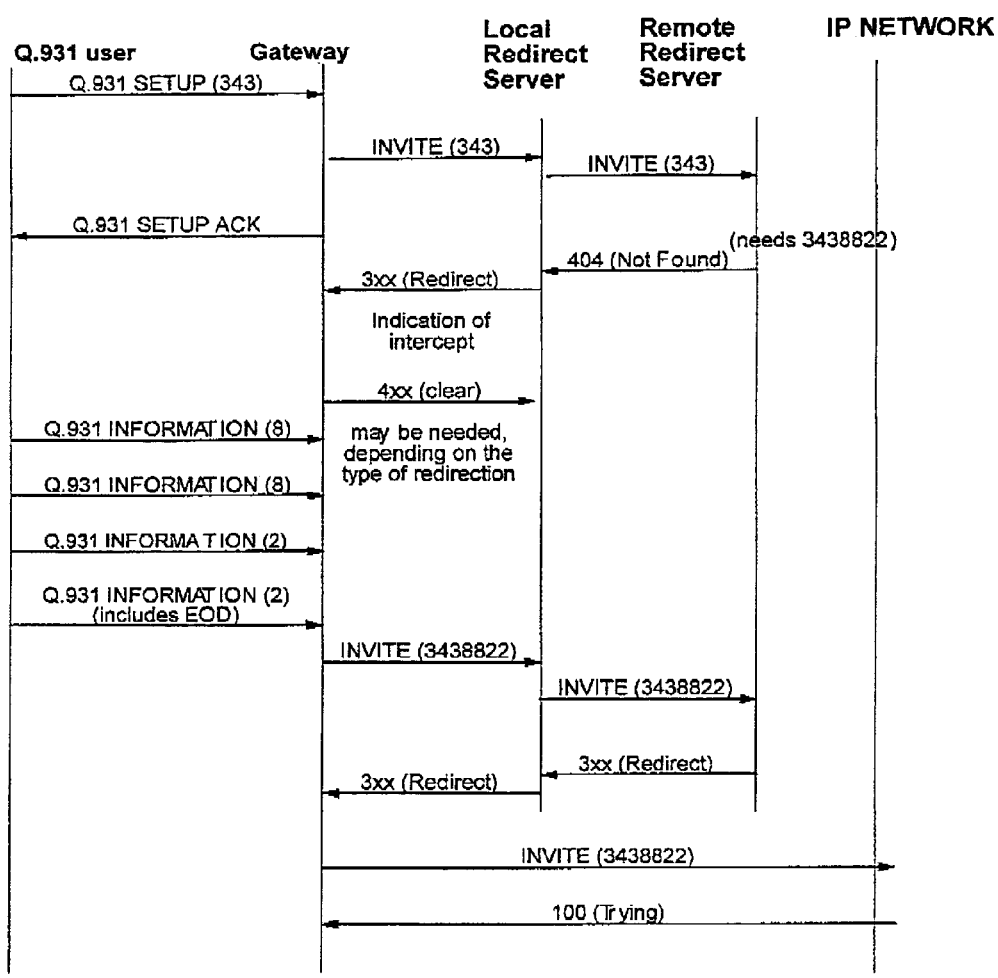
FIG. 22 is a schematic diagram of a SIP originator call flow to an overlap incapable intermediate redirect server.
Figure 23:
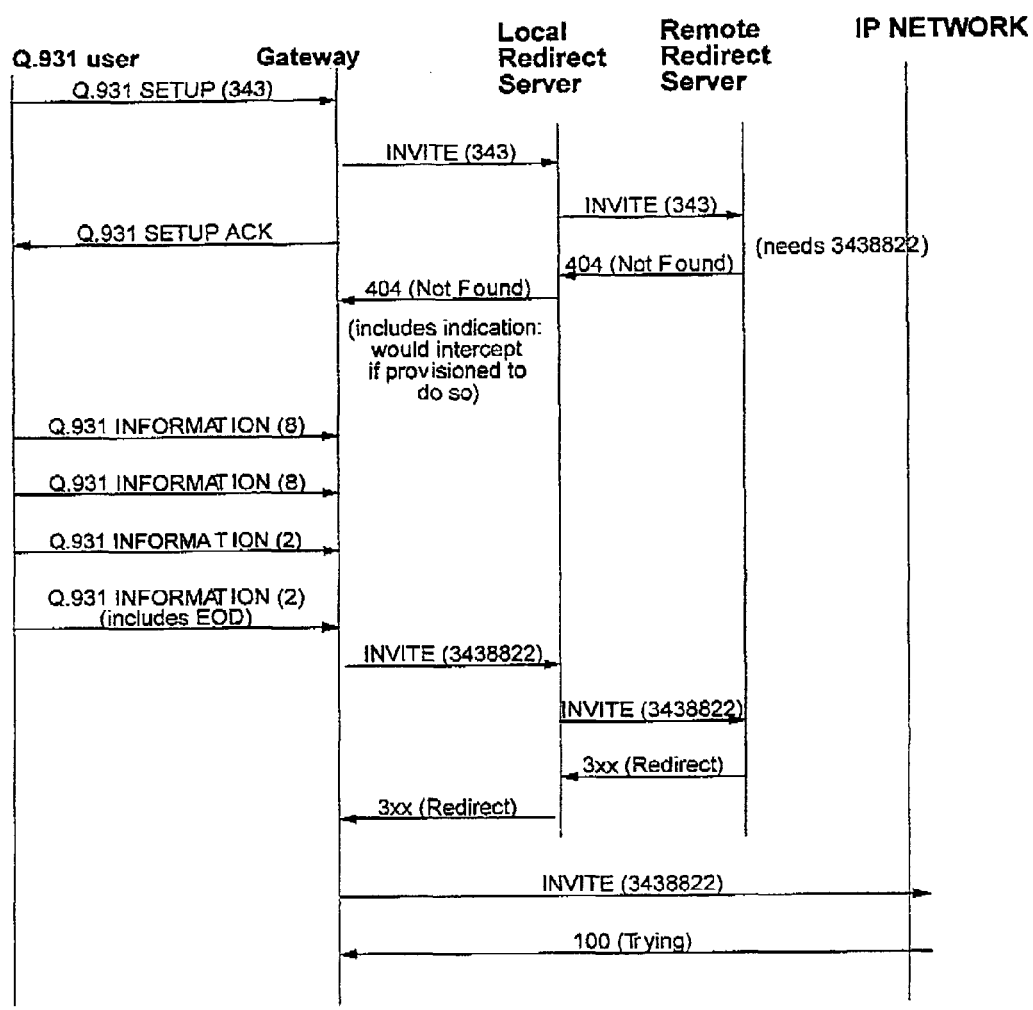
FIG. 23 is a schematic diagram of a SIP originator call flow to an overlap incapable intermediate proxy server.

The SIP equivalent is simpler, but comparable (FIGS. 22 and 23). If the call is routed to the intercept destination, the indication is provided exactly as per the H.323 ACFG with interception case.

The redirect server model, except for the messaging, is identical (see FIG. 22).

If we look at the proxy server model (FIG. 23), the flow is very similar to a call to an "en bloc only" gateway; the major difference is that the proxy server replies with the 404 instead of the destination. Note that the 404 (Not Found) is the same trigger used by the SIP destination to trigger overlap to en bloc, so this is not part of the intercept treatment enhancement. Rather, for the enhancement the indicator must not be sent.

Abnormal Feature Operation

Mixed Networks of Overlap Capable and En Bloc Capable Servers

It is unavoidable that overlap capable gatekeepers and other servers will co-reside with ones that cannot do all of the necessary overlap function. As a result, the servers (including gatekeepers) and the gateways must be able to provide some means of accommodating this.

The simplest example is in the "Location Request" (LRQ) handling. H.323 versions lower than release 4 do not support the "incomplete address" reason code in the Location Reject (LRJ). As a result, if an overlap gatekeeper registered to a local overlap capable gatekeeper sends a digit string in the ARQ that the gatekeeper cannot resolve, that gatekeeper will query its peers. But, if the remote gatekeeper supports version 3 or lower in the standard (or does not support overlap even though the gatekeeper conforms to version 4), no "incomplete" can be returned. Any LRQ sent to the remote gatekeeper either is rejected with a cause indicating failure, or the gatekeeper ignores the request.

The local gatekeeper can determine its own capabilities. It cannot determine remote capabilities. It also cannot second guess returned reasons; a "request denied" may have been triggered by messaging error, or by the sender not having any way to indicate an incomplete number.

To resolve this issue, when a local H.323 gatekeeper determines from the local provisioning and received responses that no completion can occur, it returns either the routing information for the intercept station as the destination in the ACF, or an ARJ indicating failure to the gateway. However, since there is no way to differentiate between a "normal ACF" and a "default route ACF" (and a "normal ARJ" and an "I would have sent the default route in the ACF but none was provisioned ARJ"), the message—typically, the non-standard data—is enhanced to allow indicating this to the gateway. (This should initially be done in the non-standard data, since the element includes vendor information and as a result, gateways that do not support the capability can read the manufacturer information and, not being able to support it, ignore the data.)

A similar case applies for the SIP servers, except that the rejection of 404 (Not Found) looks like a trigger to start overlap to en bloc collection in SIP. Therefore, only the ACF equivalent—the 3xx (Redirect) messages or anything after the 100 (Trying)—need to be able to inform the originator of the need for redirection.

Enhancement of Messages

The protocol is relatively simple. A data block (which could be called the "Default Route Indication" or some similar name; "Default Route Indicator" is used here for convenience) includes an identifier (type indicator for H.323, MIME type for SIP, . . . ), length, and an indicator of the handling to be followed.

As part of the protocol, all end points supporting it must have a pre-defined way to handle the indication. That is, if the gatekeeper or server indicates that a route to an intercept destination was selected (or would have been selected if the entry had been provisioned) by sending the "Default Route Indicator" (DRI), then any gateway supporting the protocol must have a pre-determined general handling procedure to handle the indication.

The rationale for the general handling procedure is simple. The protocol is designed to be fully forward compatible. If any recommendation (for convenience in describing it here, called the DRI Recommendation, or DRIR) sent to a gateway by the gatekeeper cannot be found in the list of DRIR values understood by the gateway, then the gateway has to have a defined procedure for handling this event. That is, the following algorithm applies:

If the gateway recognizes the recommendation and it is valid in all ways, the gateway uses the recommendation.

If the gateway recognizes the recommendation but there is a reason why it cannot apply (for example, if a recommendation such as "wait for more digits" existed but the call was from an en bloc gateway, there WILL be no more digits), the gateway either uses the general handling procedure or some other selected procedure.

If the gateway does not recognize the recommendation it uses the general handling procedure. This includes recommendations that have not yet been defined, so the protocol covers forward compatibility.

The importance of this capability within a mixed network is simple. If requests for information are broadcast to the peer servers and no positive responses return, this may be because there can be no positive response; the number may be completely undefined. On the other hand, the server "may just not have responded" but the number may be valid.

The list of possible DRIR values includes, but is not limited to:

Use the indicated data including message type (either route to the intercept station or clear the call, as applicable)

Can use the data, but preferred to wait for one or more digits and retry

Can use the data, but preferred to collect digits and wait for end of dial

No indication available; implicitly, use gateway default

Use whatever is the default for the gateway, explicitly

For ease of propagation across mixed networks using different protocols, the DRIR values should be common for all signalling variants, using short ASCII strings. Sample strings, based on the list above, could be:

"UDR": Use Data to Route; use the indicated data including message type (either route to the intercept station or clear the call, as applicable)

"RWMD": Retry With More Digits; can use the data, but preferred to wait for one or more digits and retry "WEOD": Wait for End Of Dial; can use the data, but preferred to collect digits and wait for end of dial "NULL" or no string provided: No indication available; implicitly, use gateway default "UGD": Use Gateway Default; use whatever is the default for the gateway, explicitly Implementation of Intercept Treatments Many end point devices provide a mechanism to handle calls that arrive on en bloc accesses with invalid or incomplete numbers. As a general grouping, these can be called "intercept treatment" cases.

The typical handling using H.323 for convenience in the description is as follows:

The call arrives on the H.323 interface as an H.225.0 SETUP.

Since the interface supports only en bloc, it returns an H.225.0 CALL PROCEEDING.

The system parses the called number. It identifies the fact that the number is either incomplete or invalid. It checks for handling of invalid/vacant/unassigned numbers.

The system finds out that the call is to reroute to a specified terminal or device (or, possibly, a pool of devices such as a group hunt list). The call reroutes.

It is recommended that this is provided on all destination gateways, and should also be what the "default route to intercept station treatment" provided by the gatekeeper or other servers implements. The destination number provided was unknown, so the server gave a default destination, intercepting the call to a user or device that can correctly deal with the call from there.

The difficulty is that unlike "default route" handling, intercept handling occurs with no notification to the originating side. The call "just terminates"; because the intercept station (or device) received the call, the H.225.0 ALERTING. 180 (Ringing), or other message returns to the originator and the originating gateway has to conclude that the number was sufficient to terminate and ends overlap digit collection.

This causes inconsistency. If the destination device provides intercept treatment, calls to specific destinations on that gateway cannot terminate directly unless all digits are in the H.225.0 SETUP, SIP INVITE, etc. In this case, the behaviour of the overlap capable node in the overlap to en bloc call is significantly worse than an en bloc to en bloc call.

The user may choose to not use an interception capability for this type of trunk call. The user may accept that calls to intercept stations will increase. Or, the way to resolve this is to have all calls sent to destinations that are (a) en bloc and (b) provide intercept treatment be handled as en bloc at the originator. This would mean any calls to that destination change handling so that they are processed in the IP network as en bloc calls, and therefore the final H.225.0 SETUP (SIP INVITE, . . . ) is sent only when all digits have been dialled.

What is claimed is:

1. A method of processing a telephony call in an IP telecommunications network comprising the steps of:
    (a) receiving a call setup request for a telephony call,
    (b) recognizing that the called number cannot be resolved to an IP address,
    (c) generating a failure message utilizing overlap signaling indicating the telephony call cannot complete and including an enhancement indicator, the enhancement indicator indicating a handling procedure to be followed upon receipt of the failure message;
    (d) determining which action to take in response to the failure message chosen from the group of acting in response to the failure message and acting in response to the enhancement indicator; and
    (e) converting overlap signaling to en bloc signaling in a gateway-type device in response to the enhancement indicator at end of dial.

2. A method according to claim 1 wherein the failure message also includes a recommendation which indicates a recommended action to be taken in response to the failure message.

3. A method according to claim 2 wherein the network acts in response to the recommendation to collect more digits from the caller and retry the telephony call at end of dial.

4. A method according to claim 2 wherein the network acts in response to the recommendation to collect at least one more digit from the caller and retry the call.

5. A method according to claim 1 wherein the network acts in response to the enhancement indicator to collect more digits from the caller and retry the telephony call at end of dial.

6. A method according to claim 1 wherein the network acts in response to the enhancement indicator to collect at least one more digit from the caller and retry the telephony call.

7. A method according to claim 1 wherein the failure message is generated by the gatekeeper-type device selected from a group including an H.323 gatekeeper, a media gateway controller, a SIP redirection server and a SIP proxy server.

8. A method according to claim 1, wherein the step of determining which action to take in response to the failure message is taken by the gateway-type device.

9. A media gateway for an IP telecommunications network, arranged to receive an enhanced failure message via overlap signaling which includes an enhancement indicator, the enhancement indicator indicating a handling procedure to be followed upon receipt of the failure message and further arranged to determine which action to take in response to the failure message chosen from the group of acting in response to the failure message and following the handling procedure indicated by the enhancement indicator and converting overlap signaling to en bloc signaling in response to the enhancement indicator at end of dial.

10. A gateway according to claim 9 wherein the media gateway is further arranged to receive a failure message including a recommendation which indicates a recommended action to be taken in response to the failure message and to determine whether to follow the action indicated by the recommendation.

11. A gateway according to claim 10 arranged to collect at least one more digit from the caller and retry the call in response to the recommendation.

12. A gateway according to claim 9 to collect more digits from the caller and retry the call at end of dial in response to the enhancement indicator.

13. A gateway according to claim 9 arranged to collect at least one more digit from the caller and retry the call in response to the enhancement indicator.

14. A gateway according to claim 10 arranged to collect more digits from the caller and retry the call at end of dial in response to the recommendation.

15. A media gatekeeper-type device for an IP telecommunications network, arranged to generate an enhanced failure message via overlap signaling when a called number cannot be resolved to an IP address, determining which action to take in response to the failure message chosen from the group of acting in response to the failure message and acting in response to the enhancement indicator, the failure message including an enhancement indicator, the enhancement indicator indicating a handling procedure to be followed upon receipt of the failure message and converting overlap signaling to en bloc signaling in response to the enhancement indicator at end of dial.

16. A gatekeeper according to claim 15, further arranged to generate an enhanced failure message which includes a recommendation.

17. A computer program carried on a tangible, non-transitory computer readable medium which when executed on a media gatekeeper type device in an IP telecommunications network causes the gatekeeper-type device to recognize that a called number cannot be resolved to an IP address, and generate a failure message via overlap signaling indicating the call cannot complete and including an enhancement indicator, determining which action to take in response to the failure message chosen from the group of acting in response to the failure message and acting in response to the enhancement indicator, the enhancement indicator indicating a handling procedure to be followed upon receipt of the failure message and converting overlap signaling to en bloc signaling in response to the enhancement indicator at end of dial.

18. A computer program carried on a tangible, non-transitory computer readable medium which when executed on a media gateway device in an IP telecommunications network causes the gateway device on receipt of a failure message, via overlap signaling, indicating the call cannot complete and including an enhancement indicator, the enhancement indicator indicating a handling procedure to be followed upon receipt of the failure message, to determine which action to take in response to the failure message chosen from the group of acting in response to the failure message and acting in response to the enhancement indicator and converting overlap signaling to en bloc signalling in response to the enhancement indicator at end of dial.

\* \* \* \* \*